United States Patent
Peckham et al.

(10) Patent No.: US 12,124,997 B2
(45) Date of Patent: *Oct. 22, 2024

(54) SYSTEMS AND METHODS TO FACILITATE NESTING OF PORTFOLIOS WITHIN A COLLABORATION ENVIRONMENT

(71) Applicant: Asana, Inc., San Francisco, CA (US)

(72) Inventors: Hannah Clark Peckham, Brooklyn, NY (US); Joshua Ross Palay, New York, NY (US); Ariel Janover, San Francisco, CA (US)

(73) Assignee: Asana, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/453,874

(22) Filed: Aug. 22, 2023

(65) Prior Publication Data

US 2023/0410052 A1 Dec. 21, 2023

Related U.S. Application Data

(63) Continuation of application No. 17/315,212, filed on May 7, 2021, now Pat. No. 11,803,814.

(51) Int. Cl.
*G06Q 10/10* (2023.01)
*G06F 3/0483* (2013.01)
(Continued)

(52) U.S. Cl.
CPC ......... *G06Q 10/103* (2013.01); *G06F 3/0483* (2013.01); *G06F 21/6227* (2013.01); *G06Q 10/063114* (2013.01)

(58) Field of Classification Search
CPC .......... G06Q 10/103; G06Q 10/063114; G06F 3/0483; G06F 21/6227
See application file for complete search history.

(56) References Cited

U.S. PATENT DOCUMENTS 5,233,687 A 8/1993 Henderson, Jr.
5,524,077 A 6/1996 Faaland
(Continued)

FOREIGN PATENT DOCUMENTS

CN 101305350 A 11/2008
CN 101563671 A 10/2009
(Continued)

OTHER PUBLICATIONS

Farzad Shafiei, "Multi-Enterprise Collaborative Enterprise Resource Planning and Decision Support System", 2004, Proceedings of the 37th Hawaii International Conference on System Sciences, pp. 1-10. (Year: 2004).*
(Continued)

*Primary Examiner* — Tan D Nguyen
(74) *Attorney, Agent, or Firm* — Esplin & Associates, PC (57) ABSTRACT

Systems and methods to facilitate nesting of portfolios within a collaboration environment are described herein. Exemplary implementations may: manage environment state information maintaining a collaboration environment; obtain hierarchical information for work unit records, project records, and/or portfolio records; update the environment state information based on the role information; specify nested portfolio hierarchical information specific to the portfolio records and specifying individual portfolio records as being subordinate to other individual ones of the portfolio records; effectuate presentation of portfolio pages for the portfolio records within a user interface of the collaboration environment; and/or perform other operations.

20 Claims, 3 Drawing Sheets

(51) Int. Cl.
*G06F 21/62* (2013.01)
*G06Q 10/0631* (2023.01)

(56) References Cited

U.S. PATENT DOCUMENTS

| | | | |
|---|---|---|---|
| 5,530,861 A | 6/1996 | Diamant | |
| 5,608,898 A | 3/1997 | Turpin | |
| 5,611,076 A | 3/1997 | Durflinger | |
| 5,623,404 A | 4/1997 | Collins | |
| 5,721,770 A | 2/1998 | Kohler | |
| 5,930,774 A * | 7/1999 | Chennault | G06Q 40/06 705/36 R |
| 5,983,277 A | 11/1999 | Heile | |
| 6,024,093 A | 2/2000 | Cron | |
| 6,256,651 B1 | 7/2001 | Tuli | |
| 6,292,830 B1 | 9/2001 | Taylor | |
| 6,332,147 B1 | 12/2001 | Moran | |
| 6,343,265 B1 * | 1/2002 | Glebov | G06F 8/24 717/136 |
| 6,385,639 B1 | 5/2002 | Togawa | |
| 6,571,235 B1 * | 5/2003 | Marpe | G06F 16/954 |
| 6,621,505 B1 | 9/2003 | Beauchamp | |
| 6,629,081 B1 | 9/2003 | Cornelius | |
| 6,671,692 B1 * | 12/2003 | Marpe | G06F 16/954 715/761 |
| 6,769,013 B2 | 7/2004 | Frees | |
| 6,859,523 B1 | 2/2005 | Jilk | |
| 7,006,978 B2 * | 2/2006 | Lineberry | G06Q 10/1097 705/7.15 |
| 7,020,697 B1 | 3/2006 | Goodman | |
| 7,039,596 B1 | 5/2006 | Lu | |
| 7,086,062 B1 | 8/2006 | Faour | |
| 7,139,719 B1 | 11/2006 | Cherneff | |
| 7,349,920 B1 | 3/2008 | Feinberg | |
| 7,418,482 B1 | 8/2008 | Lusher | |
| 7,428,723 B2 | 9/2008 | Greene | |
| 7,617,240 B2 | 11/2009 | Guyan | |
| 7,640,511 B1 | 12/2009 | Keel | |
| 7,676,542 B2 | 3/2010 | Moser | |
| 7,779,039 B2 | 8/2010 | Weissman | |
| 7,788,126 B2 | 8/2010 | Wagner | |
| 7,805,327 B1 | 9/2010 | Schulz | |
| RE41,848 E | 10/2010 | Daniell | |
| 7,917,855 B1 | 3/2011 | Satish | |
| 7,979,382 B2 | 7/2011 | Guyan | |
| 7,996,744 B2 | 8/2011 | Ojala | |
| 7,996,774 B1 | 8/2011 | Sidenur | |
| 8,214,747 B1 | 7/2012 | Yankovich | |
| 8,314,809 B1 | 11/2012 | Grabowski | |
| 8,407,072 B2 * | 3/2013 | Cala | G06Q 10/063118 705/7.11 |
| 8,412,599 B2 | 4/2013 | Saiu | |
| 8,499,300 B2 | 7/2013 | Zimberg | |
| 8,522,240 B1 | 8/2013 | Merwarth | |
| 8,527,287 B1 | 9/2013 | Bhatia | |
| 8,527,327 B1 | 9/2013 | Lawrence | |
| 8,554,832 B1 | 10/2013 | Moskovitz | |
| 8,572,477 B1 | 10/2013 | Moskovitz | |
| 8,606,588 B1 * | 12/2013 | Marpe | G06Q 10/0637 705/311 |
| 8,627,199 B1 | 1/2014 | Handley | |
| 8,639,552 B1 | 1/2014 | Chen | |
| 8,768,751 B2 | 7/2014 | Jakowski | |
| 8,831,879 B2 | 9/2014 | Stamm | |
| 8,843,832 B2 | 9/2014 | Frields | |
| 8,863,021 B1 | 10/2014 | Bee | |
| 9,009,096 B2 | 4/2015 | Pinckney | |
| 9,024,752 B2 | 5/2015 | Tumayan | |
| 9,143,839 B2 | 9/2015 | Reisman | |
| 9,152,668 B1 | 10/2015 | Moskovitz | |
| 9,201,952 B1 | 12/2015 | Chau | |
| 9,208,262 B2 | 12/2015 | Bechtel | |
| 9,251,484 B2 | 2/2016 | Cantor | |
| 9,350,560 B2 | 5/2016 | Hupfer | |
| 9,383,917 B2 | 7/2016 | Mouton | |
| 9,405,532 B1 | 8/2016 | Sullivan | |
| 9,405,810 B2 | 8/2016 | Smith | |
| 9,406,034 B2 * | 8/2016 | Aleong | G06Q 10/103 |
| 9,454,623 B1 | 9/2016 | Kaptsan | |
| 9,514,424 B2 | 12/2016 | Kleinbart | |
| 9,552,226 B1 | 1/2017 | Norbeck, Jr. | |
| 9,600,136 B1 | 3/2017 | Yang | |
| 9,674,361 B2 | 6/2017 | Ristock | |
| 9,712,576 B1 | 7/2017 | Gill | |
| 9,785,445 B2 | 10/2017 | Mitsui | |
| 9,830,398 B2 | 11/2017 | Schneider | |
| 9,842,312 B1 | 12/2017 | Rosati | |
| 9,949,681 B2 | 4/2018 | Badenes | |
| 9,953,282 B2 | 4/2018 | Shaouy | |
| 9,959,420 B2 | 5/2018 | Kiang | |
| 9,978,040 B2 | 5/2018 | Lee | |
| 9,990,636 B1 | 6/2018 | Lewis | |
| 10,001,911 B2 | 6/2018 | Breedvelt-Schouten | |
| 10,003,693 B2 | 6/2018 | Wolthuis | |
| 10,083,412 B2 | 9/2018 | Suntinger | |
| 10,157,355 B2 | 12/2018 | Johnson | |
| 10,192,181 B2 | 1/2019 | Katkar | |
| 10,235,156 B2 | 3/2019 | Johnson | |
| 10,264,067 B2 | 4/2019 | Subramani | |
| 10,282,405 B1 | 5/2019 | Silk | |
| 10,308,992 B2 | 6/2019 | Chauvin | |
| 10,373,084 B2 | 8/2019 | Kurjanowicz | |
| 10,373,090 B2 | 8/2019 | Holm | |
| 10,382,501 B2 | 8/2019 | Malatesha | |
| 10,455,011 B2 | 10/2019 | Kendall | |
| 10,496,943 B2 | 12/2019 | De | |
| 10,594,788 B2 | 3/2020 | Larabie-Belanger | |
| 10,606,859 B2 | 3/2020 | Smith | |
| 10,613,735 B1 | 4/2020 | Karpe | |
| 10,616,151 B1 | 4/2020 | Cameron | |
| 10,623,359 B1 | 4/2020 | Rosenstein | |
| 10,671,692 B2 | 6/2020 | Koopman | |
| 10,684,870 B1 | 6/2020 | Sabo | |
| 10,706,484 B1 | 7/2020 | Murnock | |
| 10,785,046 B1 | 9/2020 | Raghavan | |
| 10,810,222 B2 | 10/2020 | Koch | |
| 10,846,105 B2 | 11/2020 | Granot | |
| 10,846,297 B2 | 11/2020 | Smith | |
| 10,922,104 B2 | 2/2021 | Sabo | |
| 10,956,845 B1 | 3/2021 | Sabo | |
| 10,970,299 B2 | 4/2021 | Smith | |
| 10,977,434 B2 | 4/2021 | Pelz | |
| 10,983,685 B2 | 4/2021 | Karpe | |
| 11,082,281 B2 | 8/2021 | Justin | |
| 11,087,261 B1 | 8/2021 | Basu | |
| 11,095,468 B1 | 8/2021 | Pandey | |
| 11,113,667 B1 | 9/2021 | Jiang | |
| 11,121,996 B2 | 9/2021 | Chen | |
| 11,138,021 B1 | 10/2021 | Rosenstein | |
| 11,140,174 B2 | 10/2021 | Patel | |
| 11,204,683 B1 | 12/2021 | Sabo | |
| 11,212,242 B2 | 12/2021 | Cameron | |
| 11,263,228 B2 | 3/2022 | Koch | |
| 11,288,081 B2 | 3/2022 | Sabo | |
| 11,290,296 B2 | 3/2022 | Raghavan | |
| 11,327,645 B2 | 5/2022 | Karpe | |
| 11,341,444 B2 | 5/2022 | Sabo | |
| 11,341,445 B1 | 5/2022 | Cheng | |
| 2002/0065798 A1 | 5/2002 | Bostleman | |
| 2002/0082889 A1 | 6/2002 | Oliver | |
| 2002/0099679 A1 | 7/2002 | Usitalo | |
| 2002/0143594 A1 | 10/2002 | Kroeger | |
| 2002/0184191 A1 * | 12/2002 | Marpe | G06Q 30/0201 |
| 2003/0028595 A1 | 2/2003 | Vogt | |
| 2003/0036934 A1 | 2/2003 | Ouchi | |
| 2003/0041317 A1 | 2/2003 | Sokolov | |
| 2003/0097406 A1 | 5/2003 | Stafford | |
| 2003/0097410 A1 | 5/2003 | Atkins | |
| 2003/0126001 A1 | 7/2003 | Northcutt | |
| 2003/0200223 A1 | 10/2003 | Hack | |
| 2003/0225598 A1 | 12/2003 | Yu | |
| 2003/0233265 A1 | 12/2003 | Lee | |
| 2003/0233268 A1 | 12/2003 | Taqbeem | |
| 2004/0083448 A1 | 4/2004 | Schulz | |

(56) References Cited

U.S. PATENT DOCUMENTS

| | | |
|---|---|---|
| 2004/0093290 A1 | 5/2004 | Doss |
| 2004/0093351 A1 | 5/2004 | Lee |
| 2004/0098291 A1 | 5/2004 | Newburn |
| 2004/0125150 A1 | 7/2004 | Adcock |
| 2004/0162833 A1 | 8/2004 | Jones |
| 2004/0187089 A1 | 9/2004 | Schulz |
| 2004/0207249 A1 | 10/2004 | Baumgartner |
| 2004/0230447 A1 | 11/2004 | Schwerin-Wenzel |
| 2004/0268451 A1 | 12/2004 | Robbin |
| 2005/0210394 A1 | 9/2005 | Crandall |
| 2005/0216111 A1 | 9/2005 | Ooshima |
| 2005/0222971 A1 | 10/2005 | Cary |
| 2006/0028917 A1 | 2/2006 | Wigginton |
| 2006/0047454 A1 | 3/2006 | Tamaki |
| 2006/0064434 A1 | 3/2006 | Gilbert |
| 2006/0085245 A1 | 4/2006 | Takatsuka |
| 2006/0095859 A1 | 5/2006 | Bocking |
| 2006/0136441 A1 | 6/2006 | Fujisaki |
| 2006/0143270 A1 | 6/2006 | Wodtke |
| 2006/0167736 A1 | 7/2006 | Weiss |
| 2006/0190391 A1 | 8/2006 | Cullen, III |
| 2006/0200264 A1 | 9/2006 | Kodama |
| 2006/0218551 A1 | 9/2006 | Berstis |
| 2006/0224430 A1 | 10/2006 | Butt |
| 2006/0277487 A1 | 12/2006 | Poulsen |
| 2007/0016646 A1 | 1/2007 | Tendjoukian |
| 2007/0025567 A1 | 2/2007 | Fehr |
| 2007/0038494 A1 | 2/2007 | Kreitzberg |
| 2007/0041542 A1 | 2/2007 | Schramm |
| 2007/0050225 A1 | 3/2007 | Leslie |
| 2007/0073575 A1 | 3/2007 | Yomogida |
| 2007/0143169 A1 | 6/2007 | Grant |
| 2007/0147178 A1 | 6/2007 | Masuda |
| 2007/0150327 A1 | 6/2007 | Dromgold |
| 2007/0232278 A1 | 10/2007 | May |
| 2007/0239725 A1 | 10/2007 | Bhat |
| 2007/0255674 A1 | 11/2007 | Mahoney |
| 2007/0255715 A1 | 11/2007 | Li |
| 2007/0260499 A1 | 11/2007 | Greef |
| 2007/0271126 A1 | 11/2007 | Hunter |
| 2007/0288283 A1 | 12/2007 | Fitzpatrick |
| 2007/0294344 A1 | 12/2007 | Mohan |
| 2008/0033777 A1 | 2/2008 | Shukoor |
| 2008/0046471 A1 | 2/2008 | Moore |
| 2008/0079730 A1 | 4/2008 | Zhang |
| 2008/0082389 A1 | 4/2008 | Gura |
| 2008/0082956 A1 | 4/2008 | Gura |
| 2008/0091782 A1 | 4/2008 | Jakobson |
| 2008/0120129 A1 | 5/2008 | Seubert |
| 2008/0126930 A1 | 5/2008 | Scott |
| 2008/0134069 A1 | 6/2008 | Horvitz |
| 2008/0155547 A1 | 6/2008 | Weber |
| 2008/0158023 A1 | 7/2008 | Chung |
| 2008/0167937 A1 | 7/2008 | Coughlin |
| 2008/0175104 A1 | 7/2008 | Grieb |
| 2008/0195964 A1 | 8/2008 | Randell |
| 2008/0221946 A1 | 9/2008 | Balon |
| 2008/0222566 A1 | 9/2008 | Daughtrey |
| 2008/0244582 A1 | 10/2008 | Brown |
| 2008/0268876 A1 | 10/2008 | Gelfand |
| 2008/0270198 A1 | 10/2008 | Graves |
| 2008/0281665 A1 | 11/2008 | Opaluch |
| 2008/0313004 A1 | 12/2008 | Ryan |
| 2009/0048986 A1 | 2/2009 | Anderson |
| 2009/0055796 A1 | 2/2009 | Springborn |
| 2009/0076878 A1 | 3/2009 | Woerner |
| 2009/0089133 A1 | 4/2009 | Johnson |
| 2009/0094623 A1 | 4/2009 | Chakra |
| 2009/0113310 A1 | 4/2009 | Appleyard |
| 2009/0133027 A1 | 5/2009 | Gunning |
| 2009/0167553 A1 | 7/2009 | Hong |
| 2009/0187454 A1 | 7/2009 | Khasin |
| 2009/0199192 A1 | 8/2009 | Laithwaite |
| 2009/0204463 A1 | 8/2009 | Burnett |
| 2009/0204471 A1 | 8/2009 | Elenbaas |
| 2009/0234699 A1 | 9/2009 | Steinglass |
| 2009/0241053 A1 | 9/2009 | Augustine |
| 2009/0260010 A1 | 10/2009 | Burkhart |
| 2009/0287523 A1 | 11/2009 | Lau |
| 2009/0296908 A1 | 12/2009 | Lee |
| 2009/0299803 A1 | 12/2009 | Lakritz |
| 2009/0307319 A1 | 12/2009 | Dholakia |
| 2010/0005087 A1 | 1/2010 | Basco |
| 2010/0070888 A1 | 3/2010 | Watabe |
| 2010/0088137 A1 | 4/2010 | Weiss |
| 2010/0106627 A1 | 4/2010 | O'Sullivan |
| 2010/0114786 A1 | 5/2010 | Aboujaoude |
| 2010/0115523 A1 | 5/2010 | Kuschel |
| 2010/0122334 A1 | 5/2010 | Stanzione |
| 2010/0131860 A1 | 5/2010 | Dehaan |
| 2010/0145801 A1 | 6/2010 | Chekuri |
| 2010/0169146 A1 | 7/2010 | Hoyne |
| 2010/0169802 A1 | 7/2010 | Goldstein |
| 2010/0180212 A1 | 7/2010 | Gingras |
| 2010/0223575 A1 | 9/2010 | Leukart |
| 2010/0269049 A1 | 10/2010 | Fearon |
| 2010/0299171 A1 | 11/2010 | Lau |
| 2010/0312605 A1 | 12/2010 | Mitchell |
| 2010/0313151 A1 | 12/2010 | Wei |
| 2011/0015961 A1 | 1/2011 | Chan |
| 2011/0022662 A1 | 1/2011 | Barber-Mingo |
| 2011/0054968 A1 | 3/2011 | Galaviz |
| 2011/0055177 A1 | 3/2011 | Chakra |
| 2011/0060720 A1 | 3/2011 | Devereux |
| 2011/0071878 A1 | 3/2011 | Gingras |
| 2011/0071893 A1 | 3/2011 | Malhotra |
| 2011/0072372 A1 | 3/2011 | Fritzley |
| 2011/0093538 A1 | 4/2011 | Weir |
| 2011/0093619 A1 | 4/2011 | Nelson |
| 2011/0113365 A1 | 5/2011 | Kimmerly |
| 2011/0154216 A1 | 6/2011 | Aritsuka |
| 2011/0161128 A1 | 6/2011 | Barney |
| 2011/0184768 A1 | 7/2011 | Norton |
| 2011/0270644 A1 | 11/2011 | Roncolato |
| 2011/0307100 A1 | 12/2011 | Schmidtke |
| 2011/0307772 A1 | 12/2011 | Lloyd |
| 2012/0030194 A1 | 2/2012 | Jain |
| 2012/0035942 A1 | 2/2012 | Graupner |
| 2012/0066030 A1 | 3/2012 | Limpert |
| 2012/0066411 A1 | 3/2012 | Jeide |
| 2012/0072251 A1 | 3/2012 | Mircean |
| 2012/0079449 A1 | 3/2012 | Sanderson |
| 2012/0110087 A1 | 5/2012 | Culver |
| 2012/0117499 A1 | 5/2012 | Mori |
| 2012/0123835 A1 | 5/2012 | Chu |
| 2012/0131191 A1 | 5/2012 | May |
| 2012/0158946 A1 | 6/2012 | Shafiee |
| 2012/0192086 A1 | 7/2012 | Ghods |
| 2012/0221963 A1 | 8/2012 | Motoyama |
| 2012/0239451 A1 | 9/2012 | Caligor |
| 2012/0254218 A1 | 10/2012 | Ali |
| 2012/0266068 A1 | 10/2012 | Ryman |
| 2012/0278388 A1 | 11/2012 | Kleinbart |
| 2012/0296993 A1 | 11/2012 | Heyman |
| 2012/0304187 A1 | 11/2012 | Maresh |
| 2012/0317108 A1 | 12/2012 | Okazaki |
| 2013/0007332 A1 | 1/2013 | Teh |
| 2013/0013560 A1 | 1/2013 | Goldberg |
| 2013/0014023 A1 | 1/2013 | Lee |
| 2013/0018688 A1 | 1/2013 | Nudd |
| 2013/0021629 A1 | 1/2013 | Kurilin |
| 2013/0066944 A1 | 3/2013 | Laredo |
| 2013/0067375 A1 | 3/2013 | Kim |
| 2013/0067549 A1 | 3/2013 | Caldwell |
| 2013/0073328 A1 | 3/2013 | Ehrler |
| 2013/0103412 A1 | 4/2013 | Nudd |
| 2013/0124638 A1 | 5/2013 | Barreto |
| 2013/0151421 A1 | 6/2013 | Van Der Ploeg |
| 2013/0151604 A1 | 6/2013 | Ranade |
| 2013/0173486 A1 | 7/2013 | Peters |
| 2013/0179208 A1 | 7/2013 | Chung |
| 2013/0179799 A1 | 7/2013 | Savage |
| 2013/0215116 A1 | 8/2013 | Siddique |
| 2013/0227007 A1 | 8/2013 | Savage |

(56) References Cited

U.S. PATENT DOCUMENTS

| | | |
|---|---|---|
| 2013/0246110 A1 | 9/2013 | Nakhayi Ashtiani |
| 2013/0246399 A1 | 9/2013 | Schneider |
| 2013/0275229 A1 | 10/2013 | Moganti |
| 2013/0279685 A1 | 10/2013 | Kohler |
| 2013/0317871 A1 | 11/2013 | Kulkarni |
| 2013/0321467 A1 | 12/2013 | Tappen |
| 2013/0339099 A1 | 12/2013 | Aidroos |
| 2013/0339831 A1 | 12/2013 | Gulanikar |
| 2014/0007005 A1 | 1/2014 | Libin |
| 2014/0012603 A1 | 1/2014 | Scanlon |
| 2014/0025767 A1 | 1/2014 | De Kezel |
| 2014/0036639 A1 | 2/2014 | Taber |
| 2014/0040780 A1 | 2/2014 | Brian |
| 2014/0040905 A1 | 2/2014 | Tadanobu |
| 2014/0058801 A1 | 2/2014 | Deodhar |
| 2014/0059910 A1 | 3/2014 | Norton |
| 2014/0074536 A1 | 3/2014 | Meushar |
| 2014/0089719 A1 | 3/2014 | Daum |
| 2014/0101310 A1 | 4/2014 | Savage |
| 2014/0156539 A1 | 6/2014 | Brunet |
| 2014/0165001 A1 | 6/2014 | Shapiro |
| 2014/0172478 A1 | 6/2014 | Vadasz |
| 2014/0189017 A1 | 7/2014 | Prakash |
| 2014/0200944 A1 | 7/2014 | Henriksen |
| 2014/0208325 A1 | 7/2014 | Chen |
| 2014/0215344 A1 | 7/2014 | Ligman |
| 2014/0229609 A1 | 8/2014 | Wong |
| 2014/0236663 A1 | 8/2014 | Smith |
| 2014/0244334 A1 | 8/2014 | De |
| 2014/0257894 A1 | 9/2014 | Melahn |
| 2014/0279294 A1 | 9/2014 | Field-Darragh |
| 2014/0288987 A1 | 9/2014 | Liu |
| 2014/0310047 A1 | 10/2014 | De |
| 2014/0310051 A1 | 10/2014 | Meng |
| 2014/0350997 A1 | 11/2014 | Holm |
| 2014/0364987 A1 | 12/2014 | Shikano |
| 2015/0006448 A1 | 1/2015 | Gupta |
| 2015/0007058 A1 | 1/2015 | Wooten |
| 2015/0012324 A1 | 1/2015 | Lance |
| 2015/0012330 A1 | 1/2015 | Sugiura |
| 2015/0052437 A1 | 2/2015 | Crawford |
| 2015/0058053 A1 | 2/2015 | De |
| 2015/0066559 A1* | 3/2015 | Brouwer ............ G06Q 10/1097 705/327 |
| 2015/0113540 A1 | 4/2015 | Rabinovici |
| 2015/0134393 A1 | 5/2015 | De |
| 2015/0142507 A1 | 5/2015 | Osman |
| 2015/0153906 A1 | 6/2015 | Liao |
| 2015/0213411 A1 | 7/2015 | Swanson |
| 2015/0215256 A1 | 7/2015 | Ghafourifar |
| 2015/0262111 A1 | 9/2015 | Yu |
| 2015/0286990 A1 | 10/2015 | Adair |
| 2015/0312375 A1 | 10/2015 | Valey |
| 2015/0317595 A1 | 11/2015 | De |
| 2015/0339006 A1 | 11/2015 | Chaland |
| 2015/0363092 A1 | 12/2015 | Morton |
| 2015/0363733 A1 | 12/2015 | Brown |
| 2015/0379472 A1 | 12/2015 | Gilmour |
| 2016/0012368 A1 | 1/2016 | O'Connell |
| 2016/0048408 A1 | 2/2016 | Madhu |
| 2016/0048786 A1 | 2/2016 | Fukuda |
| 2016/0063192 A1 | 3/2016 | Johnson |
| 2016/0063449 A1 | 3/2016 | Duggan |
| 2016/0072750 A1 | 3/2016 | Kass |
| 2016/0110670 A1 | 4/2016 | Chatterjee |
| 2016/0124775 A1 | 5/2016 | Ashtiani |
| 2016/0140474 A1 | 5/2016 | Vekker |
| 2016/0140501 A1 | 5/2016 | Figlin |
| 2016/0147773 A1 | 5/2016 | Smith |
| 2016/0147846 A1 | 5/2016 | Smith |
| 2016/0148157 A1 | 5/2016 | Walia |
| 2016/0180277 A1 | 6/2016 | Skiba |
| 2016/0180298 A1 | 6/2016 | Mcclement |
| 2016/0182311 A1 | 6/2016 | Borna |
| 2016/0188145 A1 | 6/2016 | Vida |
| 2016/0216854 A1 | 7/2016 | Mcclellan |
| 2016/0224939 A1 | 8/2016 | Chen |
| 2016/0234391 A1 | 8/2016 | Wolthuis |
| 2016/0275436 A1 | 9/2016 | Kurjanowicz |
| 2016/0313934 A1 | 10/2016 | Isherwood |
| 2016/0328217 A1 | 11/2016 | Hagerty |
| 2016/0342927 A1 | 11/2016 | Reznik |
| 2017/0004213 A1 | 1/2017 | Cunico |
| 2017/0009387 A1 | 1/2017 | Ge |
| 2017/0017364 A1 | 1/2017 | Kekki |
| 2017/0017924 A1 | 1/2017 | Kashiwagi |
| 2017/0039503 A1 | 2/2017 | Jones |
| 2017/0061341 A1 | 3/2017 | Haas |
| 2017/0068933 A1 | 3/2017 | Norton |
| 2017/0093874 A1 | 3/2017 | Uthe |
| 2017/0099296 A1 | 4/2017 | Fisher |
| 2017/0103369 A1 | 4/2017 | Thompson |
| 2017/0116552 A1 | 4/2017 | Deodhar |
| 2017/0132200 A1 | 5/2017 | Noland |
| 2017/0140310 A1 | 5/2017 | Gottemukkala |
| 2017/0147960 A1 | 5/2017 | Jahagirdar |
| 2017/0153799 A1 | 6/2017 | Hoyer |
| 2017/0154024 A1 | 6/2017 | Subramanya |
| 2017/0177671 A1 | 6/2017 | Allgaier |
| 2017/0185592 A1 | 6/2017 | Frei |
| 2017/0192642 A1 | 7/2017 | Fishman |
| 2017/0206217 A1 | 7/2017 | Deshpande |
| 2017/0249577 A1 | 8/2017 | Nishikawa |
| 2017/0316367 A1 | 11/2017 | Candito |
| 2017/0317898 A1 | 11/2017 | Candito |
| 2017/0323233 A1 | 11/2017 | Bencke |
| 2017/0323267 A1 | 11/2017 | Baek |
| 2017/0323350 A1 | 11/2017 | Laderer |
| 2017/0344754 A1 | 11/2017 | Kumar |
| 2017/0346861 A1 | 11/2017 | Pearl |
| 2017/0351385 A1 | 12/2017 | Ertmann |
| 2018/0032524 A1 | 2/2018 | Byron |
| 2018/0052943 A1 | 2/2018 | Hui |
| 2018/0053127 A1 | 2/2018 | Boileau |
| 2018/0059910 A1 | 3/2018 | Wooten |
| 2018/0060785 A1 | 3/2018 | Carnevale |
| 2018/0060818 A1 | 3/2018 | Ishiyama |
| 2018/0063063 A1 | 3/2018 | Yan |
| 2018/0068271 A1 | 3/2018 | Abebe |
| 2018/0075387 A1 | 3/2018 | Kulkarni |
| 2018/0075413 A1 | 3/2018 | Culver |
| 2018/0083792 A1 | 3/2018 | Wanderski |
| 2018/0088754 A1 | 3/2018 | Psenka |
| 2018/0089625 A1 | 3/2018 | Rosati |
| 2018/0095938 A1 | 4/2018 | Monte |
| 2018/0102989 A1 | 4/2018 | Borsutsky |
| 2018/0131649 A1 | 5/2018 | Ma |
| 2018/0157477 A1 | 6/2018 | Johnson |
| 2018/0165610 A1 | 6/2018 | Dumant |
| 2018/0173386 A1 | 6/2018 | Adika |
| 2018/0189706 A1 | 7/2018 | Newhouse |
| 2018/0189736 A1 | 7/2018 | Guo |
| 2018/0225795 A1 | 8/2018 | Napoli |
| 2018/0247352 A1 | 8/2018 | Rogers |
| 2018/0260081 A1 | 9/2018 | Beaudoin |
| 2018/0262620 A1 | 9/2018 | Wolthuis |
| 2018/0285471 A1 | 10/2018 | Hao |
| 2018/0316636 A1 | 11/2018 | Kamat |
| 2018/0331842 A1 | 11/2018 | Faulkner |
| 2018/0341928 A1 | 11/2018 | Khan |
| 2018/0357049 A1 | 12/2018 | Epstein |
| 2018/0367477 A1 | 12/2018 | Hariram |
| 2018/0367483 A1 | 12/2018 | Rodriguez |
| 2018/0373804 A1 | 12/2018 | Zhang |
| 2019/0005048 A1 | 1/2019 | Crivello |
| 2019/0014070 A1 | 1/2019 | Mertvetsov |
| 2019/0018552 A1 | 1/2019 | Bloy |
| 2019/0034057 A1 | 1/2019 | Rudchenko |
| 2019/0068390 A1 | 2/2019 | Gross |
| 2019/0079909 A1 | 3/2019 | Purandare |
| 2019/0080289 A1 | 3/2019 | Kreitler |
| 2019/0095839 A1 | 3/2019 | Itabayashi |
| 2019/0095846 A1 | 3/2019 | Gupta |
| 2019/0102700 A1 | 4/2019 | Babu |

(56) References Cited

U.S. PATENT DOCUMENTS

| | | |
|---|---|---|
| 2019/0138583 A1 | 5/2019 | Silk |
| 2019/0138589 A1 | 5/2019 | Udell |
| 2019/0138961 A1 | 5/2019 | Santiago |
| 2019/0139004 A1 | 5/2019 | Vukovic |
| 2019/0147386 A1 | 5/2019 | Balakrishna |
| 2019/0187987 A1 | 6/2019 | Fauchère |
| 2019/0213509 A1 | 7/2019 | Burleson |
| 2019/0236516 A1 | 8/2019 | Ponnusamy |
| 2019/0258972 A1 | 8/2019 | De Spong |
| 2019/0265821 A1 | 8/2019 | Pearl |
| 2019/0340296 A1 | 11/2019 | Cunico |
| 2019/0340574 A1 | 11/2019 | Ekambaram |
| 2019/0347094 A1 | 11/2019 | Sullivan |
| 2019/0347126 A1 | 11/2019 | Bhandari |
| 2019/0370320 A1 | 12/2019 | Kalra |
| 2020/0005241 A1 | 1/2020 | Westwood |
| 2020/0019907 A1 | 1/2020 | Notani |
| 2020/0059539 A1 | 2/2020 | Wang |
| 2020/0065736 A1 | 2/2020 | Relangi |
| 2020/0162315 A1 | 5/2020 | Siddiqi |
| 2020/0192538 A1 | 6/2020 | Karpe |
| 2020/0192908 A1 | 6/2020 | Smith |
| 2020/0193556 A1 | 6/2020 | Jin |
| 2020/0218551 A1 | 7/2020 | Sabo |
| 2020/0228474 A1 | 7/2020 | Cameron |
| 2020/0233879 A1 | 7/2020 | Papanicolaou |
| 2020/0244611 A1 | 7/2020 | Rosenstein |
| 2020/0328906 A1 | 10/2020 | Raghavan |
| 2020/0344253 A1 | 10/2020 | Kurup |
| 2021/0004380 A1 | 1/2021 | Koch |
| 2021/0004381 A1 | 1/2021 | Smith |
| 2021/0097466 A1 | 4/2021 | Sabo |
| 2021/0103451 A1 | 4/2021 | Sabo |
| 2021/0110347 A1 | 4/2021 | Khalil |
| 2021/0136012 A1 | 5/2021 | Barbitta |
| 2021/0182475 A1 | 6/2021 | Pelz |
| 2021/0216562 A1 | 7/2021 | Smith |
| 2021/0232282 A1 | 7/2021 | Karpe |
| 2021/0320891 A1 | 10/2021 | Rosenstein |
| 2021/0342786 A1 | 11/2021 | Jiang |
| 2021/0382734 A1 | 12/2021 | Rosenstein |
| 2022/0019320 A1 | 1/2022 | Sabo |
| 2022/0058548 A1 | 2/2022 | Garg |
| 2022/0075792 A1 | 3/2022 | Koch |
| 2022/0078142 A1 | 3/2022 | Cameron |
| 2022/0158859 A1 | 5/2022 | Raghavan |
| 2023/0085649 A1 | 3/2023 | Garg |

FOREIGN PATENT DOCUMENTS

| | | | | |
|---|---|---|---|---|
| CN | 102378975 B | | 5/2015 | |
| CN | 107403308 A | * | 11/2017 | ......... G06F 16/1734 |
| CN | 108961026 A | * | 12/2018 | |
| WO | WO-0139027 A2 | * | 5/2001 | ............. G06Q 30/02 |
| WO | WO-0139047 A2 | * | 5/2001 | ............ G06F 16/954 |
| WO | WO-0139083 A1 | * | 5/2001 | ............. G06Q 10/06 |
| WO | 2015036817 A1 | | 3/2015 | |
| WO | 2015123751 A1 | | 8/2015 | |
| WO | 2016099586 A1 | | 6/2016 | |
| WO | 2020006634 A1 | | 1/2020 | |

OTHER PUBLICATIONS

Amir Ghapanchi, "A Methodology for selecting portfolios of projects with Interactions and under Uncertainty," 2012, International Journal of Project Management, 30, pp. 791-803. (Year: 2012).*

Alexandra Mihalache, "Project Management Tools For Agile Teams", 2017, Informatica Economical vol. 21, No. 4, pp. 85-93. (Year: 2017).*

G. Shankaranarayanan, "Managing Accuracy of Project Data in a Distributed Project Setting," 2010, Babson College, pp. 1-15. (Year: 2010).*

Jonathan Roberts, "Sketching designs using the Five Design-Sheet Methodology" 2016, IEEE Transactions on Visualization and Computer Graphics, vol. 22, No. 1, pp. 419-428. (Year: 2016).*

"U.S. Appl. No. 14/584,750, Examiner Interview Summary mailed Feb. 25, 2016", 3 pgs.

"U.S. Appl. No. 14/584,750, Non Final Office Action mailed Aug. 28, 2015", 21 pgs.

"U.S. Appl. No. 14/584,750, Notice of Allowance mailed Mar. 28, 2016", 8 pgs.

"U.S. Appl. No. 14/584,750, Response filed Feb. 29, 2015 to Non Final Office Action mailed Aug. 28, 2015", 16 pgs.

"U.S. Appl. No. 14/584,850, Final Office Action mailed Sep. 1, 2017", 31 pgs.

"U.S. Appl. No. 14/584,850, Non Final Office Action mailed Jan. 10, 2017", 9 pgs.

"U.S. Appl. No. 14/584,850, Response filed Apr. 10, 2017 to Non Final Office Action mailed Jan. 10, 2017", 13 pgs.

"How to Asana: Inviting teammates to Asana." YouTube, Asana, Mar. 21, 2017, https://www.youtube.com/watch?v=TLOruY1KyxU (Year: 2017), 13 pages.

"Rules of Data Conversion from Document to Relational Databases", published: 2014, publisher: Future-processing, pp. 1-8 (Year: 2014).

(Tiburca, Andrew) Best Team Calendar Applications for 2018— Toggl https://toggl.com/blog/best-team-calendar-applications-for-2018 (Year: 2017) 3 pages.

Asana Demo and Product Tour, you tube excerpt, Dec. 7, 2017 https://www.youtube.com/watch?v=IMAFWVLGFyw (Year: 2017) (16 pages).

Asana integrations, Asana tutorial, youtube, excerpt, Nov. 16, 2016 https://www.youtube.com/watch?v=hBiQ7DJNinE (Year: 2016) (21 pages).

Asana Workload and Portfolios, youtube, excerpt, Aug. 1, 2019 https://www.youtube.com/watch?v=7XkNcfFDG6M (Year: 2019) (20 pages).

Asana YouTube channel, list of all product videos, Nov. 19 2014-Aug. 19, 2019 https://www.youtube.com/user/AsanaTeam/videos?disable_polymer=1 (Year: 2019) (5 pages).

Asana, Task dependencies, archives org, Aug. 25, 2017 https://web.archive.org/web/20170825002141/https://asana.com/guide/help/tasks/dependencies (Year: 2017) (5 pages).

Asana,Manage your team capacity with Workload, youtube, excerpt, Aug. 1, 2019 https://www.youtube.com/watch?v=2ufXyZDzZnA &list=PLJFG93oi0wJAi UwyOhIGWHdtJzJrzyIBv (Year: 2019) (1 page).

Assef, F., Cassius, T. S., & Maria, T. S. (2018). Confrontation between techniques of time measurement. Journal of Manufacturing Technology Management, 29(5), 789-810. (Year: 2018).

Biggs, "GateGuru Relaunches With New Ways to Streamline Your Travel Experience", Techcrunch, (Apr. 26, 2013), 3 pgs.

Castaneda Samuel, Introduction Manual—Asana, Sep. 25, 2017 https://static1.squarespace.com/static/586d532ae58c6232db243a65/t/5c210c10f950b7fc7a8e3274/1545669658049/Asana+Manual.pdf (Year: 2017) (20 pages).

Command and control, wikipedia, archives org, Mar. 16, 2018 https://web.archive.org/web/20180316193655/https://en.wikipedia.org/wiki/Command_and_control (Year: 2018), 6 pages.

Creating Tables with Fields from 2 Different Tables, published: 2009, publisher: StackOverflow, pp. 1-2. (Year: 2009).

Critical chain project management, Wikipedia, archives org, Dec. 17, 2016 https://web.archive.Org/web/20161217090326/https://en.wikipedia.org/wiki/Critical_chain_project_management (Year: 2016) 5 pages.

Critical Path Method, Wikipedia, archives org, Sep. 19, 2017 https://web.archive.Org/web/20170919223814/https://en.wikipedia.org/wiki/Critical_path_method (Year: 2017) 6 pages.

Dawei Li, "Deepcham: Collaborative Edge-Mediated Adaptive Deep Learning for Mobile Object Recognition", 2016, IEEE/ACM, pp. 64-76. (Year: 2016).

Dvorak, Daniel D., et al. "Goal-based operations: an overview." Journal of Aerospace Computing, Information, and Communication 6.3 (2009): 123-141. (Year: 2009).

Fruhlinger, Joshua. "The Best to-do ListApps for Feeling Productive; With the right app, feeling productive can be just as gratifying (56) References Cited

OTHER PUBLICATIONS as actually getting things done" Wall Street Journal (Online); New York, N.Y. [New York, N.Y]Nov. 8, 2013 (Year: 2013) 4 pages.
Hartmann, "TimeProjectscheduling with resource capacities and requests varying with time: a case study," 2013, Flexible services and manufacturing journal, vol. 25, No. 1, pp. 74-93 (Year: 2013).
Helen Mongan-Rallis & Terrie Shannon, "Synchronous Chat," Aug. 2016, Dept. of Education, Univ. of MN Duluth, web.archive.org/web/20160825183503/https://www.d.umn.edu/hrallis/professional/presentations/cotfsp06/indiv_tools/sync_chat.htm (Year: 2016) (2 pages).
How to Asana Asana time tracking, youtube, excerpt, May 24, 2017 https://www.youtube.com/watch?v=z91qlex-TLc (Year: 2017) (1 page).
How to Asana, Asana project management, youtube, excerpt, Mar. 7, 2017 https://www.youtube.com/watch?v=qqANMTvVpE (Year: 2017) (28 pages).
How to Asana, Creating your first Asana project, youtube, excerpt, Jan. 31, 2017 https://www.youtube.com/watch?v=L04WmcUdsLo (Year: 2017) (1 page).
How to Asana, Getting Asana into your workflow, youtube, excerpt, Jul. 17, 2017 https://www.youtube.com/watch?v=7YLrNMdv30 (Year: 2017) (24 pages).
How to Asana, Planning with Asana calendar, youtube excerpt, Feb. 14, 2017 https://www.youtube.com/watch?v=w816KYiVPyc (Year: 2017) (19 pages).
How to Asana, Using Asana for task management, youtube, excerpt, Feb. 7, 2017 https://www.youtube.com/watch?v=vwvbgiejhQ (Year: 2017) (8 pages).
How to Asana, Visualizing work with Asana kanban boards, youtube, excerpt, Feb. 21, 2017 https://www.youtube.com/watch?v=jmZaZGydfPY (Year: 2017) (41 pages).
How to Asana, Workflow management, youtube, excerpt, May 30, 2017 https://www.youtube.com/watch?v=rk8nPWmXsRo (Year: 2017) (9 pages).
How to use Advanced Search in Asana, Asana tutorial, May 25, 2016 https://www.youtube.com/watch?v=5VyJ3toPfQM (Year: 2016) (28 pages).
Justin Rosenstein, Unveiling the Future of Asana, Mar. 28, 2018 https://www.youtube.com/watch?v=nRI?d_WM4Bc (Year: 2018) (2 pages).
Lauren Labrecque, "Fostering Consumer-Brand Relationships in Social Media Environments: The Role of Parasocial Interaction", 2014, Journal of Interactive Markeing, 28 (2014), pp. 134-148 (Year: 2014).
Macro, computer science, wikipedia, archives org, 6 pages, Feb. 11, 2020 http://web.archive.org/web/20200211082902/https://en.wikipedia.org/wiki/Macro_(computer_science) (Year: 2020) 6 pages.
Mauricio Aizawa, Zapier, How to Automate Asana Tasks creation using Evernote, youtube excerpts, Mar. 16, 2018 https://www.youtube.com/watch?v=BjDQ4Gny4WI (Year: 2018) (8 pages).
Paul Minors, How to automate your tasks, youtube excerpts, Oct. 18, 2019 https://www.youtube.com/watch?v=lwF9XyUQrzw (Year: 2019).
Prioritize My Tasks in Asana, Asana tutorial, youtube, excerpt, May 25, 2016 https://www.youtube.com/watch?v=UbCnMvw01nl (Year: 2016) (3 pages).
Project views, Asana tutorial, youtube, excerpt May 25, 2016 https://www.youtube.com/watch?v=FYjA8ZH3ceQ (Year: 2016) (5 pages).
Tony Grundy, "Strategy Implementation and Project Management," 1998, International Journal of Project Management, vol. 16, No. 1, pp. 43-50. (Year: 1998).
Using Asana Premium, Asana tutorial, youtube, excerpt, Sep. 10, 2016 https://www.youtube.com/watch?v=vMgLtDDmyeo (Year: 2016) (4 pages).
Where does Asana fit in, archives org, Jul. 8, 2017 https://web.archive.org/web/20170708150928/https://asana.com/guide/resources/infosheets/where-does-asana-fit (Year: 2017) (5 pages).
L. Wu and H. Sahraoui, "Accommodating software development collaboration," 12th Asia-Pacific Software Engineering Conference (APSEC'05), Taipei, Taiwan, 2005, pp. 8 pp.-, doi: 10.1109/APSEC. 2005.23. (Year: 2005).
Wix.com, How to Use Wix Code with Marketing Tools to Create Custom Events, Oct. 18, 2018, YouTube, https://www.youtube.com/watch?v=MTBVykOYGvO&feature=emb_title, 2 pages.
www.asana.com (as retrieved from https://web.archive.Org/web/20160101054536/https://asana.com/press and https://web.archive.org/web/20160101054527/https://asana.com/product) (Year: 2016) 15 pages.
www.cogmotive.com/blog/author/alan Alan Byrne: "Creating a company Shared Calendar in Office 365"; pp. 1-17; Sep. 10, 2013 (16 pages).

\* cited by examiner

SYSTEMS AND METHODS TO FACILITATE NESTING OF PORTFOLIOS WITHIN A COLLABORATION ENVIRONMENT

FIELD OF THE DISCLOSURE

The present disclosure relates to systems and methods to facilitate nesting of portfolios within a collaboration environment.

BACKGROUND

Collaboration environments, sometimes referred to as work management platforms, may enable users to assign projects, tasks, or other assignments to assignees (e.g., other users) to complete. A collaboration environment may comprise an environment in which individual users and/or a virtual team of users does its work and may enable users to work in a more organized and efficient manner. Projects may be a way to organize groups of tasks. Portfolios may be a way to organize groups of projects.

SUMMARY

One aspect of the present disclosure relates to a system configured to facilitate nesting of portfolios within a collaboration environment. The collaboration environment may specify a multi-tiered, hierarchical arrangement, with respect to one or more of portfolios, projects, units of work, and/or other items that make up the collaboration environment. A portfolio may include one or more projects subordinate to the portfolio and/or that make up the portfolio. A project may include one or more units of work subordinate to the project, that make up the project, and/or otherwise support the project. A unit of work may include an action item a user should carry out outside and/or within the collaboration environment. Traditionally, the hierarchy of portfolios, projects, units of work, and/or other items may create a rigid organization of information within the collaboration environment. For example, this organization may create a hardline top-down approach to access information, e.g., starting from portfolios, then to projects contained with the portfolios, and then to units of work contained within the projects. Some users may find the rigidity of this type of organization helpful due to its precision, while other users may find it difficult for these same reasons. For example, these hierarchies may not align with how some users organize, which may follow a more intuitive approach rather than this hardline rigid approach. Some problems may stem from a concept of the portfolios being rigidly fixed at the top level of these hierarchies. One or more implementations of the systems and method presented herein propose a solution where portfolios may be added to other portfolios, e.g., portfolios may be "nested" within other portfolios. This may create a nesting effect of the portfolios where a given portfolio may include one or more other portfolios that are considered "subordinate" to the given portfolio. This may eliminate the restriction of portfolios being solely fixed atop the hierarchies. Now, users may organize sets of portfolios in a way that can reflect how their teams are structured, and seamlessly monitor and communicate the health of work. The nested portfolios may allow companies to organize their work to represent different perspectives of the work, which would otherwise require tedious and disruptive navigation through seemingly endless hierarchies. In some implementations, an individual portfolio may be "multi-homed," meaning the individual portfolio may be nested within more than one other portfolio.

One or more implementations of a system to facilitate nesting of portfolios within a collaboration environment may include one or more hardware processors configured by machine-readable instructions and/or other components. Executing the machine-readable instructions may cause the one or more hardware processors to facilitate interaction with a collaboration environment based on assignment of project-level roles. The machine-readable instructions may include one or more computer program components. The one or more computer program components may include one or more of an environment state component, an organization component, a user interface component, and/or other components.

The environment state component may be configured to manage environment state information maintaining a collaboration environment and/or other information. The collaboration environment may be configured to facilitate interaction by users with the collaboration environment. The environment state information may define one or more of work unit records, project records, portfolio records, and/or other records. The work unit records may include work unit information associated with units of work managed, created, and/or assigned within the collaboration environment. The project records may include project information associated with projects managed, created, and/or assigned within the collaboration environment. The portfolio records may include portfolio information associated with portfolios managed within the collaboration environment.

The organization component may be configured to obtain hierarchical information for the records of the collaboration environment. The hierarchical information may include information for the work unit records, the project records, and the portfolio records, and/or nested portfolio hierarchical information specific to the portfolio records. The hierarchical information may specify one or more of individual work unit records as subordinate to individual project records, the individual project records as subordinate to individual portfolio records, and/or other specifications. In some implementations, an individual project record may include one or more work unit records by virtue of the one or more work unit records being subordinate to the individual project record. An individual portfolio record may include one or more project records by virtue of the one or more project records being subordinate to the individual portfolio record. By way of non-limiting illustration, a first work unit record may be subordinate to a first project record and/or other project records. The first project record may be subordinate to a first portfolio record and/or other portfolio records.

The nested portfolio hierarchical information may specify that individual portfolio records are subordinate to other individual ones of the portfolio records. By way of non-limiting illustration, the nested portfolio hierarchical information may specify a second portfolio record as being subordinate to the first portfolio record.

The user interface component may be configured to effectuate presentation of views of the collaboration environment based on one or more of the environment state information, the hierarchical information, and/or other information. In some implementations, user interface component may be configured to effectuate presentation of portfolio pages for the portfolio records within a user interface of the collaboration environment. The individual portfolio pages for the individual portfolio records may provide access to individual project records and/or other individual portfolio records that may be subordinate to the individual portfolio records. By way of non-limiting illustration, a first portfolio page for the first portfolio record may provide access to one or more of the first project record specified as subordinate to the first portfolio record, the second portfolio record specified as subordinate to the first portfolio record, and/or other records.

As used herein, any association (or relation, or reflection, or indication, or correspondency) involving servers, processors, client computing platforms, and/or another entity or object that interacts with any part of the system and/or plays a part in the operation of the system, may be a one-to-one association, a one-to-many association, a many-to-one association, and/or a many-to-many association or N-to-M association (note that N and M may be different numbers greater than 1).

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
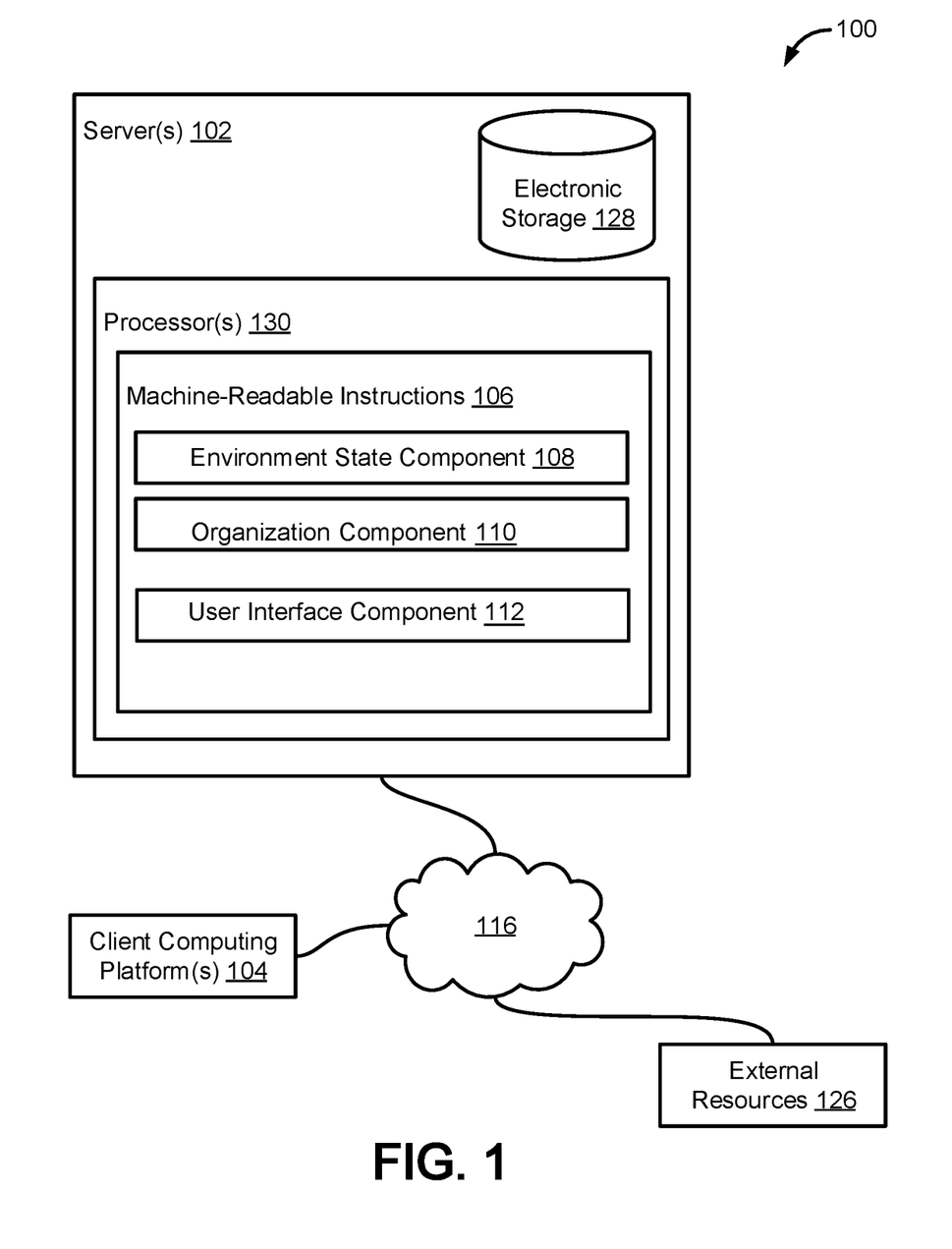
FIG. 1 illustrates a system configured to facilitate nesting of portfolios within a collaboration environment, in accordance with one or more implementations.

FIG. 1 illustrates a system 100 configured to facilitate nesting of portfolios within a collaboration environment, in accordance with one or more implementations. The collaboration environment may specify a multi-tiered, hierarchical arrangement, with respect to one or more of portfolios, projects, units of work, and/or other items that make up the collaboration environment. Traditionally, the hierarchy of portfolios, projects, units of work, and/or other items may create a rigid organization of information within the collaboration environment such that portfolios are affixed solely atop the hierarchy. One or more implementations presented herein propose "nesting" portfolios within other portfolios. This may eliminate a restriction of portfolios being solely fixed atop the hierarchies. Now, users may organize sets of portfolios in a way that can reflect how their teams are structured, and seamlessly monitor and communicate the health of work. In some implementations, an individual portfolio may be "multi-homed," meaning the individual portfolio may be nested within more than one other portfolio.

In some implementations, system 100 may include one or more of one or more servers 102, one or more client computing platforms 104, external resources 126, and/or other components. Server(s) 102 may be configured to communicate with one or more client computing platforms 104 according to a client/server architecture and/or other architectures. Client computing platform(s) 104 may be configured to communicate with other client computing platforms via server(s) 102 and/or according to a peer-to-peer architecture and/or other architectures. Users may access system 100 via client computing platform(s) 104.

Server(s) 102 may include one or more of non-transitory electronic storage 128, one or more processors 130 configured by machine-readable instructions 106, and/or other components. The non-transitory electronic storage 128 may store one or more records and/or other information. Machine-readable instructions 106 may include one or more instruction components. The instruction components may include computer program components. Executing the machine-readable instructions 106 may cause server(s) 102 to facilitate nesting of portfolios within a collaboration environment. The computer program components may include one or more of an environment state component 108, an organization component 110, a user interface component 112, and/or other components.

Environment state component 108 may be configured to manage environment state information and/or other information used in maintaining a collaboration environment. The collaboration environment may be configured to facilitate interaction by users within the collaboration environment. The environment state information may include one or more of user records, work unit records, project records, portfolio records, objective records, and/or other records. The user records may include user information comprising values of user parameters. The work unit records which may include work information comprising values for work unit parameters associated with units of work managed, created, and/or assigned within the collaboration environment. The project records may include project information associated with projects managed, created, and/or assigned within the collaboration environment. The portfolio records including portfolio information associated with portfolios managed within the collaboration environment. The objective records may include objective information associated with business objectives managed, created, and/or owned within the collaboration environment.

The user information in the user records may include values of user parameters. The values of the user parameters may be organized in user records corresponding to users interacting with and/or viewing the collaboration environment. The values of the user parameters may include information describing the users, their actions within the collaboration environment, their settings, and/or other user information; and/or metadata associated with the users, their actions within the environment, their settings, and/or other user information. Individual ones of the users may be associated with individual ones of the user records. A user record may define values of the user parameters associated with a given user.

The values of the user parameters may, by way of non-limiting example, specify one or more of: a user name, a group parameter, a user account, a user department, descriptive user content, a to-email, a from-email, a photo, an organization, a workspace, one or more user comments, one or more teams the user belongs to, one or more of the user display settings (e.g., colors, size, project order, task order, other unit of work order, etc.), one or more authorized applications, one or more interaction parameters (e.g., indicating a user is working on/worked on a given unit of work, a given user viewed a given work unit of work, a given user selected a given unit of work, a timeframe a given user last interacted with and/or worked on a given unit of work, a time period that a given unit of work has been idle, and/or other interaction parameters), one or more notification settings, one or more progress parameters, status information for one or more work units the user is associated with (units of work assigned to the user, assigned to other users by the user, completed by the user, past-due date, and/or other information), progress information for one or more business objectives the user is associated with (business objectives owned by the user, of which the user is a collaborator, fulfilled by the user, past-due date, and/or other information), one or more performance/productivity metrics of a given user (e.g., how many units of work the user has completed, how quickly the user completed the units of work, how quickly the user completes certain types of work units, the efficiency of the user, bandwidth of the user, activity level of the user, how many business objectives the user has helped fulfill through their completion of units of work, etc.), application access information (e.g., username/password for one or more third-party applications), one or more favorites and/or priorities, preference information, and/or other information.

The work information in the work unit records may include values of one or more work unit parameters. The values of the work unit parameters may be organized in work unit records corresponding to units of work managed, created, and/or assigned within the collaboration environment. A given unit of work may have one or more assignees and/or collaborators working on the given work unit. Units of work may include one or more to-do items, action items, and/or other units of work one or more users should accomplish and/or plan on accomplishing. Units of work may be created by a given user for the given user and/or created by the given user and assigned to one or more other users. Individual units of work may include one or more of an individual task, an individual sub-task, and/or other units of work assigned to and/or associated with one or more users. Individual units of work may include one or more digital content items. An individual unit of work may include an individual digital content item by virtue of the individual digital content item (and/or a copy or instance thereof) being attached and/or appended thereto. A digital content item may include one or more of an image, a video, an audio file, a PDF, a word document, and/or other digital content items.

In some implementations, units of work created by, assigned to, and/or completed by the users may refer generally to a linking of the units of work with the individual users in the collaboration environment. A unit of work may be linked with a user in a manner that defines one or more relationships between the user and the unit of work. Such a relationship may connote and/or be a result of an action (past, present, and/or future) of the user with respect to the unit of work. Such actions may include one or more of creating a work unit record for a unit of work, being assigned to participate in a unit of work, participating in a unit of work, being granted access to a work unit record of a unit of work, adjusting a value of a work unit parameter of a work unit record of a unit of work, and/or other actions.

In some implementations, the one or more work unit parameters may include one or more of a work assignment parameter, a work management parameter, work creation parameter, and/or other parameters. The values of the work assignment parameter may describe units of work assigned to the individual users. The values of the work management parameter may describe units of work managed by the individual users. The values of the work creation parameter may describe units of work created by the individual users.

In some implementations, values of work unit parameters may include one or more of a unit of work name, a unit of work description, one or more unit of work dates (e.g., a start date, a due date or end date, a completion date, and/or dates), role information, a status parameter (e.g., an update, a hardcoded status update, a completed/incomplete/mark complete, a measured status, a progress indicator, quantity of sub-work units remaining for a given unit of work, measure of urgency, and/or other status parameter), one or more user comment parameters (e.g., permission for who may make comments such as an assignee, an assignor, a recipient, one or more followers, and/or one or more other interested parties; content of the comments; one or more times; presence or absence of the functionality of up-votes; one or more hard-coded responses; and/or other parameters), one or more interaction parameters (e.g., indicating a given unit of work is being worked on/was worked on, a given work unit of work was viewed, a given unit of work was selected, how long the given unit of work has been idle, a last interaction parameter indicating when and what user last interacted with the given unit of work, users that interacted with the given unit of work, quantity and/or content of comments on the unit of work, and/or other interaction parameters indicating sources of the interactions, context of the interactions, content of the interactions and/or time for the interactions), one or more digital content item attachments, notification settings, privacy, an associated URL, one or more interaction parameters (e.g., sources of the interactions, context of the interactions, content of the interactions, time for the interactions, and/or other interaction parameters), updates, ordering of units of work within a given unit of work (e.g., tasks within a project, subtasks within a task, etc.), state of a workspace for a given unit of work (e.g., application state parameters, application status, application interactions, user information, and/or other parameters related to the state of the workspace for a unit of work), one or more performance/productivity metrics for a given unit of work, hierarchical information (see, e.g., organization component 110), permissions information (see, e.g., organization component 110), one or more custom fields (e.g., priority, cost, stage, and/or other custom fields), and/or other information.

The values of the work assignment parameter describing units of work assigned to the individual users may be determined based on one or more interactions by one or more users with a collaboration environment. In some implementations, one or more users may create and/or assign one or more unit of work to themselves and/or another user. In some implementations, a user may be assigned a unit of work and the user may effectuate a reassignment of the unit of work from the user or one or more other users.

In some implementations, values of the work assignment parameter may indicate that a status parameter of a unit of work has changed from "incomplete" to "marked complete" and/or "complete". In some implementations, a status of complete for a unit of work may be associated with the passing of an end date associated with the unit of work. In some implementations, a status of "marked complete" may be associated with a user providing input via the collaboration environment at the point in time the user completes the unit of work (which may be before or after an end date).

In some implementations, managing by the environment state component 108 include maintaining queues of the units of work assigned to the users. The queues may be presented to the users in a user interface of the collaboration environment to facilitate access to the units of work via work unit pages. A work unit page for a unit of work may comprise a user interface portion and/or dedicated user interface of the collaboration environment from which users access the unit of work. Individual queues may represent the units of work assigned to individual users organized in an order based on the individual end dates and/or other dates (e.g., start dates) and/or other ordering. Individual queues may be presented in a user interface based on one or more of a list view, a calendar view, and/or other views. The calendar view may be a calendar view by week, by more than one week (e.g., $1^{st}$ through $15^{th}$), by month, by more than one month (e.g., May through July), and/or other calendar views. Units of work may be represented in a calendar view by user interface elements (e.g., icons, calendar entries, etc.).

Project information in project records may define values of project parameters for projects managed within the collaboration environment. An individual project may include an individual set of the units of work. An individual set of units of work of an individual project may be subordinate to the individual project, make up the individual project, and/or otherwise support the individual project. The individual set of units of work may directly facilitate progress toward fulfillment of the individual project. The individual set of units of work may directly contribute to the progress. By way of non-limiting illustration, a connection between the individual set of units of work and a corresponding individual project may be direct in that completion of at least one of the units of work may have a direct impact on progress toward fulfillment of the individual project. The concept of "direct impact" may mean that completion of the at least one unit of work may cause progress toward fulfillment of the individual project based on independent action completed and/or started with respect to the at least one unit of work. Accordingly, completion of an individual set of units of work may indicate that the individual project has been completed and/or fulfilled.

The project parameters may characterize one or more projects managed within the collaboration environment and/or via the collaboration environment, and/or the metadata associated with the one or more projects. Individual ones of the projects may be associated with individual ones of the project records. The project information may define values of the project parameters associated with a given project managed within the collaboration environment and/or via the collaboration environment. A given project may have one or more owners and/or one or more collaborators working on the given project. The given project may include one or more units of work assigned to one or more users under the given project heading. In some implementations, projects may include one or more units of work that may directly facilitate progress toward fulfillment of the projects. Accordingly, completion of the set of units of work may directly contribute to progress toward fulfillment of the project. By way of non-limiting illustration, an individual project may be associated with a client and the units of work under the individual project heading may be work directly contributing to the fulfillment of a business relationship with the client.

The values of the project parameters may, by way of non-limiting example, include one or more of: one or more units of work within the project (which may include values of work unit parameters defined by one or more work unit records), one or more user comment parameters (e.g., a creator, a recipient, one or more followers, one or more other interested parties, content, one or more times, upvotes, other hard-coded responses, etc.), a project name, a project description, one or more project dates (e.g., a start date, a due date, a completion date, and/or other project dates), a status and/or progress (e.g., an update, a hardcoded status update, a measured status, quantity of units of work remaining in a given project, completed units of work in a given project, and/or other status parameter), one or more attachments, notification settings, privacy, an associated URL, one or more interaction parameters (e.g., sources of the interactions, context of the interactions, content of the interactions, time for the interactions, and/or other interaction parameters), updates, ordering of units of work within the given project, hierarchical information (see, e.g., organization component 110), permissions information (see, e.g., organization component 110), state of a workspace for a given task within the given project, and/or other information.

Portfolio information in portfolio records may define values of portfolio parameters for a portfolio managed within the collaboration environment. An individual portfolio may include one or more projects and/or one or more other portfolios. A project of a portfolio may be subordinate to the portfolio, make up the portfolio, and/or otherwise be organized within the heading of the portfolio.

The portfolio parameters may characterize portfolios managed within the collaboration environment and/or via the collaboration environment, and/or the metadata associated with the portfolios. Individual ones of the portfolios may be associated with individual ones of the portfolios records. The portfolio information may define values of the portfolio parameters associated with a given portfolio managed within the collaboration environment and/or via the collaboration environment. A given portfolio may have one or more owners and/or one or more collaborators working on the given portfolio. In some implementations, a given portfolio may not have any owners and/or collaborators at the portfolio level other than those specified with respect to the projects subordinate to the portfolio.

The values of the portfolio parameters may, by way of non-limiting example, include and/or specify one or more of: information about one or more projects within a given portfolio (which may include values of project parameters defined by one or more project records), information about one or more other portfolios within a given portfolio (which may include values of portfolio parameters defined by one or more other portfolio records), a portfolio name, a portfolio description, a status and/or progress (e.g., an update, a hardcoded status update, a measured status, quantity of units of work remaining in a given project, completed units of work in a given project, and/or other status parameter), one or more attachments, notification settings, privacy settings, an associated URL, one or more interaction parameters (e.g., sources of the interactions, context of the interactions, content of the interactions, time for the interactions, and/or other interaction parameters), updates, ordering of projects within the given portfolio, hierarchical information (see, e.g., organization component 110), permissions information (see, e.g., organization component 110), state of a workspace for a given project within the given portfolio, metadata associated with the portfolios, custom fields (e.g., values created by users), and/or other information.

The objective information in objective records may include values of one or more objective parameters. The values of the objective parameters may be organized in objective records corresponding to business objectives managed, created, and/or owned within the collaboration environment. A given business objective may have one or more collaborators, and/or team members working on the given business objective. Business objectives may include one or more associated units of work and/or projects one or more users should accomplish and/or plan on accomplishing. Business objectives may be created by a given user for the given user and/or created by the given user and assigned to be owned to one or more other users. Individual business objectives may include one or more of an individual goal, an individual sub-goal, and/or other business objectives assigned to be owned by a user and/or associated with one or more users.

The business objectives may be associated with a set of units of work and/or projects that may indirectly facilitate progress toward fulfillment of the business objectives. The set of units of work and/or projects may not directly contribute to the progress. By way of non-limiting illustration, a connection between the set of units of work and/or projects and a corresponding business objective may be indirect in that completion of at least one of the units of work and/or projects may have no direct impact on progress toward fulfillment of the business objective. The concept of "no direct impact" may mean that completion of the at least one unit of work and/or project may not cause progress toward fulfillment of the business objective without independent action outside of the at least one unit of work and/or project. Instead, the fulfillment of the at least one unit of work and/or project may make such independent action more likely (e.g., through coercion, assistance, education, incentivization, reminder, etc.). However, in some implementations, business objectives may be associated with a set of units of work and/or projects that may directly facilitate progress toward fulfillment of the business objectives. Accordingly, completion of the set of units of work and/or projects may directly contribute to the progress toward fulfillment. Business objectives may be associated with an objectives and key result (OKR) goal-setting framework. Business objectives may be specified on one or more of a team basis, organization basis, and/or other specifications. In some implementations, business objectives may be characterized as user objectives. The user objectives may be associated with a set of units of work and/or projects that may indirectly (and/or directly) facilitate progress toward fulfillment of the user objectives. User objectives may be specified on an individual user basis.

Individual objective records may describe individual business objectives and/or identify sets of individual ones of the work unit records and/or project records that specify the units of work and/or projects as being associated with the individual business objectives.

In some implementations, the one or more objective parameters may include one or more of an objective definition parameter, an objective owner parameter, an objective management parameter, an objective creation parameter, an objective progress parameter, and/or other parameters. The value of the objective definition parameter may describe the particular business objective. The values of the objective owner parameter may describe business objectives assigned to be owned by an individual user. The values of the objective management parameter may describe business objectives managed as collaborators by the individual users. The values of the objective creation parameter may describe business objectives created by the individual users.

In some implementations, the business objectives may be described based on one or more of a business objective name, a business objective description, one or more business objective dates (e.g., a start date, a due date, and/or dates), one or more users associated with a business objective, progress information (e.g., an update, a hardcoded status update, a measured status, a progress indicator, quantity value remaining for a given business objective, completed work units in a given project, and/or other progress information), one or more interaction parameters, notification settings, privacy, an associated URL, one or more custom fields (e.g., priority, cost, stage, and/or other custom fields), and/or other information.

The values of the objective owner parameter describing business objectives owned by the individual users may be determined based on one or more interactions by one or more users with a collaboration environment. In some implementations, one or more users may create and/or assign ownership of one or more business objectives to themselves and/or another user. In some implementations, a user may be assigned to own a business objective and the user may effectuate a reassignment of ownership of the business objective from the user or one or more other users.

The organization component 110 may be configured to obtain hierarchical information for the records that make up the collaboration environment. In some implementations, hierarchical information may be specified for the different types of records individually, and/or for a group of different types of records. By way of non-limiting illustration, hierarchical information for a group of different types of records may create a hierarchical arrangement which dictates access to different ones of types of the records.

In some implementations, the hierarchical information may specify work unit hierarchies. A work unit hierarchy may convey individual positions of work unit records (and their corresponding units of work) in a record hierarchy comprising solely of work unit records. By way of non-limiting illustration, a position may specify one or more of a work unit record being superior to another work unit record, a work unit record being subordinate to another work unit record, and/or other information. As a result, individual work units of work in the individual sets of work unit records may be subordinate to other individual work unit records in the individual sets of work unit records. For example, a work unit record may define a unit of work comprising a task, and a subordinate work unit record may define a unit of work comprising a sub-task to the task. A record hierarchy may define a relationship between work unit records. A work unit record may have some restrictions placed on it by virtue of having a subordinate work unit record, and vice versa. By way of non-limiting illustration, a work unit record may be restricted from access by one or more users unless and/or until a subordinate work unit record is completed and/or started.

In some implementations, the hierarchical information may specify multi-record hierarchies. A multi-record hierarchy may convey individual positions of different types of records within a record hierarchy. By way of non-limiting illustration, multi-record hierarchy may convey individual positions of work unit records, project records, and portfolio records in a record hierarchy comprising the work unit records, the project records, and the portfolio records. By way of non-limiting illustration, the hierarchical information may specify that individual work unit records are subordinate to individual project records. The hierarchical information may specify that individual project records are subordinate to individual portfolio records. By way of non-limiting illustration, an individual project record may include one or more work unit records by virtue of the one or more work unit records being subordinate to the individual project record. An individual portfolio record may include one or more project records by virtue of the one or more project records being subordinate to the individual portfolio record. By way of non-limiting illustration, the hierarchical information may specify a first work unit record may be subordinate to a first project record, and the first project record may be subordinate to a first portfolio record.

In some implementations, hierarchical information may specify nested portfolio hierarchical information specific to the portfolio records. The nested portfolio hierarchical information may specify that individual portfolio records are subordinate to other individual ones of the portfolio records. By way of non-limiting illustration, the nested portfolio hierarchical information may specify a second portfolio record as being subordinate to the first portfolio record. A record hierarchy specific to the portfolio records may automatically define relationships between the portfolio records. A portfolio record may have some restrictions placed on it by virtue of being subordinate to another portfolio record, and/or vice versa. By way of non-limiting illustration, a subordinate portfolio record may have access restrictions that conform to access restrictions of a superior portfolio record. This may allow users to nest portfolio records within other portfolio records without worrying about violating permissions that may otherwise set access restrictions. However, in some implementations, a portfolio record may not have restrictions placed on it by virtue of being subordinate to another portfolio record.

In some implementations, the nested portfolio hierarchical information may specify that individual portfolio records are concurrently subordinate to more than one other portfolio record. This may be referred to as multi-homing of a portfolio record. By way of non-limiting illustration, a third work unit record may be subordinate to a third project record, and the third project record maybe subordinate to a third portfolio record. The nested portfolio hierarchical information may specify that the second portfolio record is subordinate to the third portfolio record concurrently with being subordinate to the first portfolio record. Stated otherwise, the second portfolio record may be considered multi-homed within the first portfolio record and the third portfolio record. In the case of multi-homing, the presence of a multi-homed portfolio record in multiple other superior portfolio records may comprise separate instances of the same portfolio record, albeit having access facilitated through the different superior portfolio records.

In some implementations, the hierarchical information may specify objective record hierarchies. Individual sets of objective records may be defined by an objective record hierarchy. An objective record hierarchy may convey individual positions of objective records (and their corresponding business objectives) in the objective record hierarchy. By way of non-limiting illustration, a position may specify one or more of an objective record being superior to one or more other objective records, an objective record being subordinate to one or more other objective records, and/or other information. As a result, individual objective records may be subordinate and/or superior to other individual objective records. An objective record may define a business objective comprising a progress towards fulfillment, and a subordinate objective record may define a business objective comprising a subordinate progress towards fulfillment to the subordinate business objective. An objective record hierarchy may define a relationship between objective records. In some implementations, as a consequence of the objective record hierarchies, the individual business objectives described in the individual objective records that are subordinate to the other individual objective records may be subordinate to the individual business objectives in the other individual objective records.

The organization component 110 may be configured to determine permissions information for portfolio records and/or other records. The permissions information may include values of permission parameters. The permissions parameters may characterize permissions with respect to how users interact with the portfolio records, subordinate portfolio records, project records, work unit records, and/or other records. The permission parameters of the individual portfolio records may characterize access to the one or more of the project records that are subordinate to the individual portfolio records. In some implementations, access may be binary, including access being "granted" or access being "denied." In some implementations, access may be characterized by ability to navigate to and/or from one or more records.

In some implementations, permissions with respect to how users interact with records may be characterized based on enabling and/or disabling one or more features. Individual features may be related to the individual units of work, the individual projects, and/or other individual portfolios. The features related to the individual units of work may be specific to completing and/or supporting specific ones of the individual units of work. The features related to the individual projects may be specific to supporting the individual projects. The features related to the individual portfolios may be specific to supporting the individual projects that make up the individual portfolios (which may include the features specific to supporting the individual projects), supporting the individual units of work that make up the projects (which may include the features specific to supporting the individual units of work), and/or other interactions. In some implementations, if one or more features are not enabled for a given user, those one or more features may be deemed disabled for the given user.

In some implementations, features specific to completing and/or supporting the individual units of work may include one or more of accessing individual work unit pages for the individual units of work, specifying completion status of the individual units of work, communicating with other users linked within the individual units of work, generating meetings with the other users linked within the individual units of work, accessing application programs outside of the collaboration environment, editing the individual units of work, and/or other features.

In some implementations, specifying completion status of the individual units of work may include the ability to change values of the work assignment parameter to indicate a unit of work has changed from "incomplete" to "marked complete" and/or "complete". In some implementations, specifying completion status of the individual units of work may include the ability to change values of the work assignment parameter to indicate a unit of work has changed from "complete" or "marked complete" to "incomplete".

In some implementations, communicating with other users linked within the individual units of work may include communicating within individual work unit pages (e.g., adding comments, messages, and/or other communications), communicating within the collaboration environment (e.g., messaging system not tied to a given unit of work), communicating outside of the collaboration environment (e.g., email, SMS, etc.), and/or other considerations.

In some implementations, generating meetings with other users linked to the individual units of work may include sending invites to the other users. Sending invites may include selecting meeting participants, proposed date/time for the meeting, setting agenda topics, and/or other functionality. Meeting generation may be facilitated by functionality that is integral to the collaboration environment and/or provided through access to an external resource (e.g., third party meeting generation applications).

In some implementations, editing the individual units of work may include one or more of adding, removing, changing, updating, and/or otherwise interacting directly with values of one or more work unit parameters of the individual units of work.

In some implementations, features specific to completing and/or supporting the individual projects may be enabled within individual project pages providing access to the individual projects. The individual sets of features specific to supporting the individual projects may include one or more of accessing the individual project pages, communicating with the other users within the individual projects, generating meetings with the other users, editing the individual projects, editing the units of work within the individual projects, and/or other features.

In some implementations, communicating with the other users within the individual projects may include communicating within individual project pages (e.g., adding comments, messages, and/or other communications), communicating within the collaboration environment (e.g., messaging system not tied to a given project), communicating outside of the collaboration environment (e.g., email, SMS, etc.), and/or other considerations.

In some implementations, communicating with the other users linked to the units of work within the individual projects may include communicating within individual work unit pages (e.g., adding comments, messages, and/or other communications), communicating within the collaboration environment (e.g., messaging system not tied to a given unit of work), communicating outside of the collaboration environment (e.g., email, SMS, etc.), and/or other considerations.

In some implementations, generating meetings with the other users linked within the individual projects may include sending invites to the other users. Sending invites may include selecting meeting participants, proposed date/time for the meeting, setting agenda topics, and/or other functionality.

In some implementations, generating meetings with the other users linked to the units of work within the individual projects may include sending invites to the other users. Sending invites may include selecting meeting participants, proposed date/time for the meeting, setting agenda topics, and/or other functionality. In some implementations, generating meetings with other users may be limited to other users having some linking to one or more of the units of work that make up the project.

In some implementations, editing the individual projects may include one or more of adding, removing, changing, updating, and/or otherwise interacting directly with values of one or more project parameters of the individual projects.

In some implementations, editing the units of work within the individual projects may include one or more of adding, removing, changing, updating, and/or otherwise interacting directly with values of one or more work unit parameters of the individual units of work within the project.

In some implementations, the features available for individual units of work and/or individual projects that are subordinate to an individual portfolio may comprise the features of the individual portfolio itself. For example, the values of the permission parameters of the individual portfolio records may characterize access to one or more of the project records that may be subordinate to the individual portfolio records and/or one or more work unit records that make up the one or more project records. However, other features specifically at the portfolio level may be provided. For example, features specifically at the portfolio level may include one or more of specifying another portfolio as being subordinate, adding projects to the portfolio, removing projects from the portfolio, and/or other features.

In some implementations, sets of values of permission parameters of the individual portfolio records may be determined based on the other individual ones of the portfolio records they are subordinate to. That is, adding a portfolio to an other portfolio may cause the portfolio to take on the values of the permission parameters of the other portfolio. Accordingly, features that may be enabled and/or disabled in a superior portfolio record may be similarly enabled and/or disabled in a subordinate portfolio record. In some implementations adding and/or removing a portfolio to and from another portfolio may be facilitated by drag-and-drop input in a user interface, and/or other input.

By way of non-limiting illustration, the organization component 110 may be configured to determine a first set of values of the permission parameters for the second portfolio record in response to the second portfolio records being subordinate to the first portfolio record. The first set of values of permission parameters may be applied for the second portfolio record in response to the access of the second portfolio record from the first portfolio page. By way of non-limiting illustration, the organization component 110 may be configured to determine a second set of values of the permission parameters for the second portfolio record in response to the second portfolio records being subordinate to the third portfolio record. The second set of values of the permission parameters may be applied for the second portfolio record in response to the access of the second portfolio record from the third portfolio page. The first set of values may be different from the second set of values by virtue of the nesting within the first portfolio record and third portfolio record, respectively.

The user interface component 112 may be configured to effectuate presentation of user interfaces and/or other displays of the collaboration environment on individual ones of the one or more client computing platforms 104. The user interface component 112 may be configured to effectuate presentation of the collaboration environment, individual work unit pages of the collaboration environment, individual project pages of the collaboration environment, individual portfolio pages of the collaboration environment, individual objective pages of the collaboration environment, and/or other content. The user interface component 112 may be configured to effectuate presentation of the collaboration environment based on the environment state information so that access, by the users, to one or more of the individual units of work, the individual projects, individual portfolios, and/or individual business objectives reflects one or more of the hierarchical information, permissions information, and/or other information.

In some implementations, user interface component 112 may be configured to effectuate presentation of portfolio pages for the portfolio records within a user interface of the collaboration environment. The individual portfolio pages for the individual portfolio records may provide access to the individual project records, other individual portfolio records, and/or other records that may be subordinate to the individual portfolio records. By way of non-limiting illustration, a first portfolio page for the first portfolio record may provide access to the first project record that is subordinate to the first portfolio record, the second portfolio record that is subordinate to the first portfolio record, and/or other content. In the case of multi-homing, a third portfolio page for the third portfolio record may provide access to one or more of the third project record that is subordinate to the third portfolio record, to the second portfolio record that is subordinate to the third portfolio record, and/or other content. The access to the second portfolio record via the third portfolio page may be separate and distinct from the access to the second portfolio record via the first portfolio page by virtue of utilizing separate instances of the second portfolio record.

The individual portfolio pages for the individual portfolio records may include individual user interface elements representing the individual project records, the other individual portfolio records, and/or other content subordinate to the individual portfolio records. Users may interact with the portfolio pages through selection of the individual user interface elements representing individual project records, individual portfolio records, and/or other content. The selection of a user interface element representing a project record may effectuate presentation of a project page for the project record. The selection of a user interface element representing a portfolio record may effectuate presentation of a portfolio page for the portfolio record. In some implementations, providing access to individual project records from individual superior portfolio records may include navigating away from the individual portfolio pages of the individual superior portfolio records to individual project pages of the individual subordinate project records. In some implementations, providing access to the individual subordinate portfolio records from individual superior portfolio records includes navigating away from the individual portfolio pages of the individual superior portfolio records to other individual portfolio pages of the individual subordinate portfolio records.

User interface component 112 may be configured to provide access to (e.g., enable) and/or restrict access to (e.g., disable) features for the users based on hierarchical information and its impact on permissions information. User interface component 112 may be configured to determine whether or not the users have a certain set of features enabled based on their navigation to one or more records from one or more superior records.

In some implementations, user interface component 112 may be configured to obtain input information and/or other information. The input information may convey user input into a user interface presented on the client computing platform(s) 104. A set of user interface elements may be provided on the user interface to facilitate the user input and/or other user interaction with the user interface. The user interface elements may include one or more of text input fields, drop down menus, check boxes, display windows, virtual buttons, and/or other elements configured to facilitate user interaction.

In some implementations, environment state information may be updated as users continue to interact with the collaboration environment via the user interfaces over time. The environment state component 108 may store and/or archive the environment state information periodically and/or based on user request to archive. In some implementations, the environment state component 108 may store historical environment state information specifying historical user information, historical work information, historical project information, historical portfolio information, historical objective information, user interaction history, historical hierarchy information, and/or other information.

Figure 3:
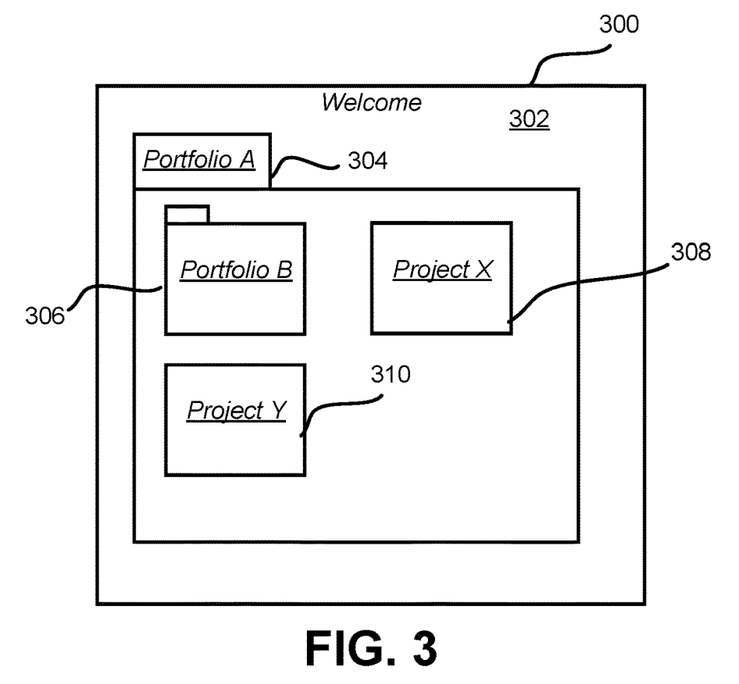
FIG. 3 illustrates a user interface, in accordance with one or more implementations.

FIG. 3 illustrates a user interface 300 of a collaboration environment, in accordance with one or more implementations. The user interface 300 may illustrate a nesting of portfolios within the collaboration environment, in accordance with one or more implementations. The user interface 300 may present a portfolio page 302 for a portfolio 304 (referred to as "Portfolio A"). Hierarchical information may specify that one or more of a project record for a first project 308 (referred to as "Project X") is subordinate to a portfolio record for the portfolio 304, a project record for a second project 310 (referred to as "Project Y") is subordinate to the portfolio record for the portfolio 304, and/or that a portfolio record for a second portfolio 306 (referred to as "Portfolio B") is subordinate to the portfolio record for the portfolio 304. Permission information for one or more of the first project 308, the second project 310, and/or the second portfolio 306 may be determined based on being subordinate to the portfolio 304.

The portfolio page 302 of the portfolio 304 may include individual user interface elements representing individual ones of the first project 308, the second project 310, and the second portfolio 306. Selection of an individual user interface element may effectuate presentation of respective ones of the individual project pages for the individual project records, and other individual portfolio pages for the other individual portfolio records.

Figure 4:
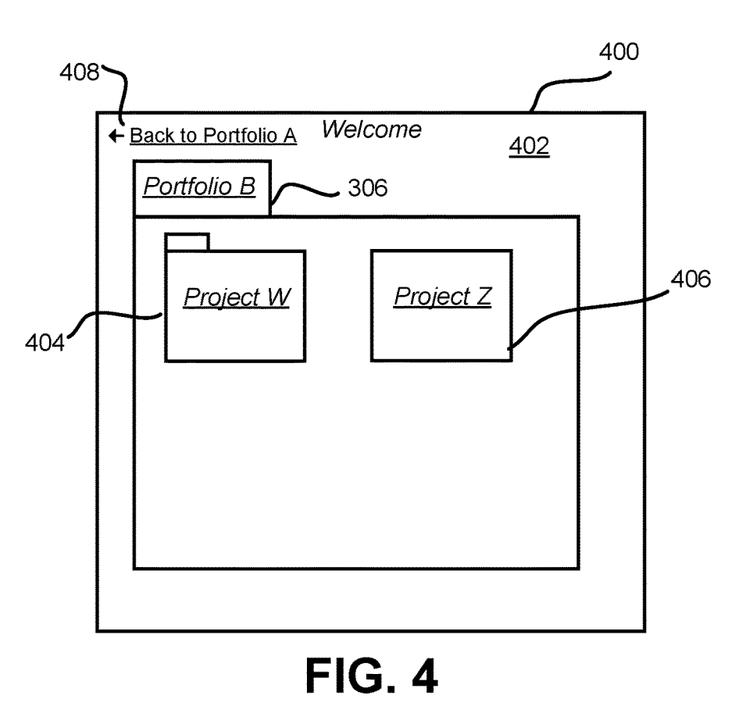
FIG. 4 illustrates a user interface, in accordance with one or more implementations.

FIG. 4 illustrates a user interface 400 of a collaboration environment, in accordance with one or more implementations. The user interface 400 may present a second portfolio page 402 for the portfolio 306 ("Portfolio B"). The second portfolio page 402 may be presented in response to selection of the user interface element representing the second portfolio 306 from user interface 300 of FIG. 3. Hierarchical information may specify that one or more of a project record for a third project 404 (referred to as "Project W") is subordinate to a portfolio record for the second portfolio 306, and/or a project record for a fourth project 406 (referred to as "Project Z") is subordinate to the portfolio record for the second portfolio 306. The user interface 400 may include a user interface element 408 to facilitate navigation back to the project page 302 of FIG. 3.

Referring back to FIG. 1, in some implementations, server(s) 102, client computing platform(s) 104, and/or external resources 126 may be operatively linked via one or more electronic communication links. For example, such electronic communication links may be established, at least in part, via a network 116 such as the Internet and/or other networks. It will be appreciated that this is not intended to be limiting, and that the scope of this disclosure includes implementations in which server(s) 102, client computing platform(s) 104, and/or external resources 126 may be operatively linked via some other communication media.

A given client computing platform may include one or more processors configured to execute computer program components. The computer program components may be configured to enable an expert or user associated with the given client computing platform to interface with system 100 and/or external resources 126, and/or provide other functionality attributed herein to client computing platform(s) 104. By way of non-limiting example, the given client computing platform 104 may include one or more of a desktop computer, a laptop computer, a handheld computer, a tablet computing platform, a NetBook, a Smartphone, a gaming console, and/or other computing platforms.

External resources 126 may include sources of information outside of system 100, external entities participating with system 100, and/or other resources. In some implementations, some or all of the functionality attributed herein to external resources 126 may be provided by resources included in system 100.

Server(s) 102 may include electronic storage 128, one or more processors 130, and/or other components. Server(s) 102 may include communication lines, or ports to enable the exchange of information with a network 116 and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 128 may comprise non-transitory storage media that electronically stores information. The electronic storage media of electronic storage 128 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 128 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 128 may include one or more virtual storage resources (e.g., cloud storage, a virtual private network, and/or other virtual storage resources). Electronic storage 128 may store software algorithms, information determined by processor(s) 130, information received from server(s) 102, information received from client computing platform(s) 104, and/or other information that enables server(s) 102 to function as described herein.

Processor(s) 130 may be configured to provide information processing capabilities in server(s) 102. As such, processor(s) 130 may include one or more of a digital processor, a physical processor, an analog processor, a digital circuit designed to process information, an analog circuit designed to process information, a state machine, and/or other mechanisms for electronically processing information. Although processor(s) 130 is shown in FIG. 1 as a single entity, this is for illustrative purposes only. In some implementations, processor(s) 130 may include a plurality of processing units. These processing units may be physically located within the same device, or processor(s) 130 may represent processing functionality of a plurality of devices operating in coordination. Processor(s) 130 may be configured to execute components 108, 110, 112, and/or other components. Processor(s) 130 may be configured to execute components 108, 110, and/or 112, and/or other components by software; hardware; firmware; some combination of software, hardware, and/or firmware; and/or other mechanisms for configuring processing capabilities on processor(s) 130. As used herein, the term "component" may refer to any component or set of components that perform the functionality attributed to the component. This may include one or more physical processors during execution of processor readable instructions, the processor readable instructions, circuitry, hardware, storage media, or any other components.

It should be appreciated that although components 108, 110, and/or 112 are illustrated in FIG. 1 as being implemented within a single processing unit, in implementations in which processor(s) 130 includes multiple processing units, one or more of components 108, 110, and/or 112 may be implemented remotely from the other components. The description of the functionality provided by the different components 108, 110, and/or 112 described below is for illustrative purposes, and is not intended to be limiting, as any of components 108, 110, and/or 112 may provide more or less functionality than is described. For example, one or more of components 108, 110, and/or 112 may be eliminated, and some or all of its functionality may be provided by other ones of components 108, 110, and/or 112. As another example, processor(s) 130 may be configured to execute one or more additional components that may perform some or all of the functionality attributed below to one of components 108, 110, and/or 112.

Figure 2:
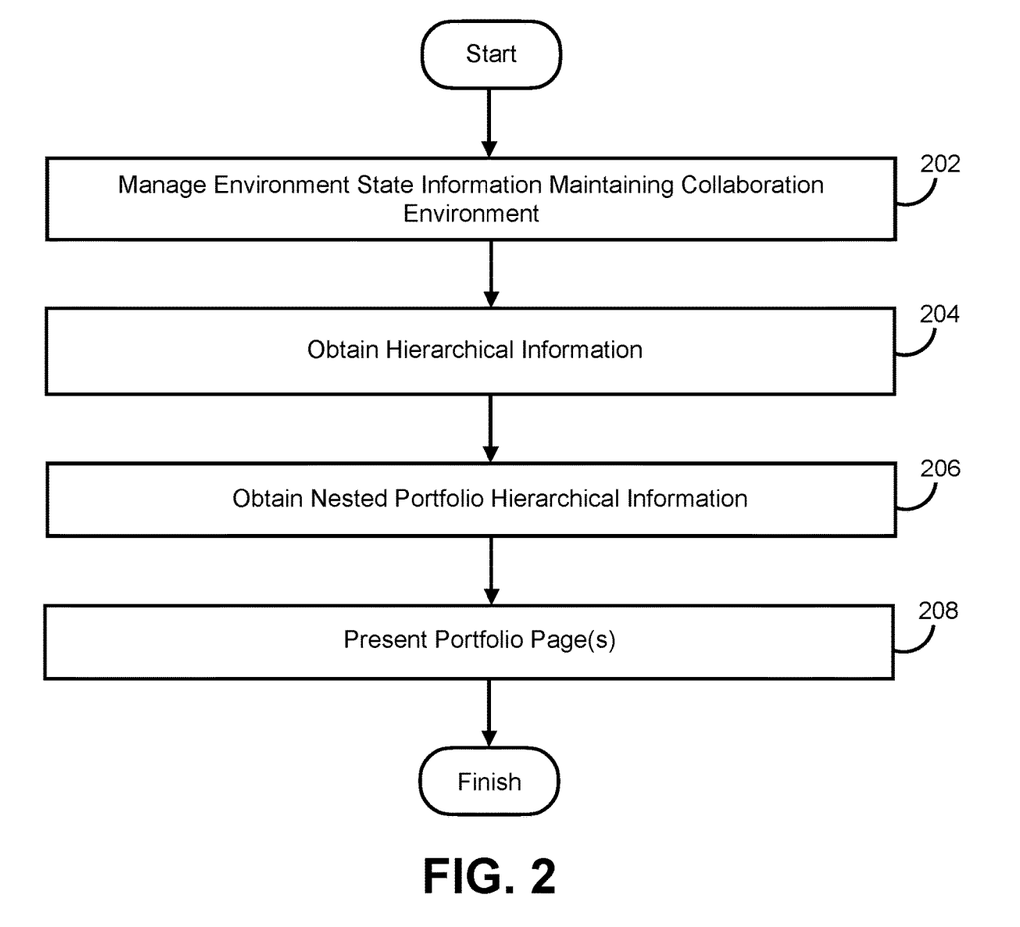
FIG. 2 illustrates a method to nest portfolios within a collaboration environment, in accordance with one or more implementations.

FIG. 2 illustrates a method 200 to facilitate nesting of portfolios within a collaboration environment, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

An operation 202 may manage environment state information maintaining a collaboration environment. The collaboration environment may be configured to facilitate interaction by users with the collaboration environment. The environment state information may include one or more of work unit records, project records, portfolio records, and/or other records. The work unit records may include work unit information associated with units of work managed, created, and/or assigned within the collaboration environment, and/or other information. The project records may include project information associated with projects managed, created, and/or assigned within the collaboration environment, and/or other information. The portfolio records may include portfolio information associated with portfolios managed within the collaboration environment, and/or other information. Operation 202 may be performed by one or more hardware processors configured by machine-readable instructions including a component that is the same as or similar to environment state component 108 (shown in FIG. 1 and described herein), in accordance with one or more implementations.

An operation 204 may obtain hierarchical information for the work unit records, the project records, and the portfolio records. The hierarchical information may specify individual work unit records as subordinate to individual project records, and/or the individual project records as subordinate to individual portfolio records. By way of non-limiting illustration, an individual project record may include one or more work unit records by virtue of the one or more work unit records being subordinate to the individual project record. By way of non-limiting illustration, an individual portfolio record may include one or more project records by virtue of the one or more project records being subordinate to the individual portfolio record. By way of non-limiting illustration, a first work unit record may be subordinate to a first project record, and the first project record may be subordinate to a first portfolio record. Operation 204 may be performed by one or more hardware processors configured by machine-readable instructions including a component that is the same as or similar to organization component 110 (shown in FIG. 1 and described herein), in accordance with one or more implementations.

An operation 206 may obtain and/or specify nested portfolio hierarchical information specific to the portfolio records. The nested portfolio hierarchical information may specify the individual portfolio records as being subordinate to other individual ones of the portfolio records. By way of non-limiting illustration, the nested portfolio hierarchical information may specify a second portfolio record as being subordinate to the first portfolio record. Operation 206 may be performed by one or more hardware processors configured by machine-readable instructions including a component that is the same as or similar to organization component 110 (shown in FIG. 1 and described herein), in accordance with one or more implementations.

An operation 208 may effectuate presentation of portfolio pages for the portfolio records within a user interface of the collaboration environment. Individual portfolio pages for the individual portfolio records may provide access to the individual project records and other individual portfolio records that are subordinate to the individual portfolio records. By way of non-limiting illustration, a first portfolio page for the first portfolio record may provide access to one or more of the first project record that is subordinate to the first portfolio record, the second portfolio record that is subordinate to the first portfolio record, and/or other records. Operation 208 may be performed by one or more hardware processors configured by machine-readable instructions including a component that is the same as or similar to user interface component 112 (shown in FIG. 1 and described herein), in accordance with one or more implementations.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A method to provide access to portfolio records of portfolios managed within a collaboration environment, the method comprising:
    managing environment state information maintaining a collaboration environment, the collaboration environment being configured to facilitate interaction by users with the collaboration environment, the environment state information including a work unit record, a project record, a first portfolio record, and a second portfolio record, wherein the work unit record is subordinate to the project record, and the project record is subordinate to the first portfolio record;
    defining nested portfolio hierarchical information, wherein the nested portfolio hierarchical information specifies the second portfolio record is subordinate to the first portfolio record concurrently with the project record being subordinate to the first portfolio record; and
    effectuating presentation of a first portfolio page for the first portfolio record within a user interface of the collaboration environment, wherein the first portfolio page provides access to the first project record that is subordinate to the first portfolio record, and provides access to the second portfolio record that is concurrently subordinate to the first portfolio record.

2. The method of claim 1, wherein:
    the environment state information further includes a second work unit record, a second project record, and a third portfolio record, wherein the second work unit record is subordinate to the second project record, and the second project record is subordinate to the third portfolio record;
    the nested portfolio hierarchical information further specifies the second portfolio record is subordinate to the third portfolio record concurrently with being subordinate to the first portfolio record; and
    a second portfolio page for the third portfolio record provides access to the second project record that is subordinate to the third portfolio record, and provides access to the second portfolio record that is subordinate to the third portfolio record, the access to the second portfolio record via the second portfolio page being separate and distinct from the access to the second portfolio record via the first portfolio page.

3. The method of claim 1, wherein providing access to the project record from the first portfolio page includes navigating away from the first portfolio page to a project page of the project record; and
    wherein providing access to the second portfolio record from the first portfolio page includes navigating away from the first portfolio page to a second portfolio page of the second portfolio record.

4. The method of claim 3, wherein navigating away from the first portfolio page to the second portfolio page of the second portfolio record is performed in response to selection of a user interface element representing the second portfolio record.

5. The method of claim 1, further comprising:
    determining a first set of values of permission parameters for the second portfolio record in response to the second portfolio record being subordinate to the first portfolio record, the first set of values of permission parameters being applied in response to accessing the second portfolio record from the first portfolio page.

6. The method of claim 5, wherein the permission parameters characterize access to one or more project records that are subordinate to the second portfolio record.

7. The method of claim 6, wherein access to the one or more project records is characterized by ability to navigate through the collaboration environment.

8. The method of claim 5, wherein the permission parameters characterize availability of features.

9. The method of claim 8, wherein the features are specific to completing and/or supporting individual units of work and/or individual projects.

10. The method of claim 9, wherein the features include one or more of specifying completion, communicating within the collaboration environment, communicating outside the collaboration environment, generating meetings, accessing application programs, or editing.

11. A system configured to provide access to portfolio records of portfolios managed within a collaboration environment, the system comprising:
one or more physical processors; and
a computer-readable medium storing machine-readable instructions that, when executed by the one or more physical processors, cause the system to perform operations comprising:
manage environment state information maintaining a collaboration environment, the collaboration environment being configured to facilitate interaction by users with the collaboration environment, the environment state information including a work unit record, a project record, a first portfolio record, and a second portfolio record, wherein the work unit record is subordinate to the project record, and the project record is subordinate to the first portfolio record;
define nested portfolio hierarchical information, wherein the nested portfolio hierarchical information specifies the second portfolio record is subordinate to the first portfolio record concurrently with the project record being subordinate to the first portfolio record; and
effectuate presentation of a first portfolio page for the first portfolio record within a user interface of the collaboration environment, wherein the first portfolio page provides access to the first project record that is subordinate to the first portfolio record, and provides access to the second portfolio record that is concurrently subordinate to the first portfolio record.

12. The system of claim 11, wherein:
the environment state information further includes a second work unit record, a second project record, and a third portfolio record, wherein the second work unit record is subordinate to the second project record, and the second project record is subordinate to the third portfolio record;
the nested portfolio hierarchical information further specifies the second portfolio record is subordinate to the third portfolio record concurrently with being subordinate to the first portfolio record; and
a second portfolio page for the third portfolio record provides access to the second project record that is subordinate to the third portfolio record, and provides access to the second portfolio record that is subordinate to the third portfolio record, the access to the second portfolio record via the second portfolio page being separate and distinct from the access to the second portfolio record via the first portfolio page.

13. The system of claim 11, wherein providing access to the project record from the first portfolio page includes navigating away from the first portfolio page to a project page of the project record; and
wherein providing access to the second portfolio record from the first portfolio page includes navigating away from the first portfolio page to a second portfolio page of the second portfolio record.

14. The system of claim 13, wherein navigating away from the first portfolio page to the second portfolio page of the second portfolio record is performed in response to selection of a user interface element representing the second portfolio record.

15. The system of claim 11, wherein execution of the machine-readable instructions by the one or more physical processors further cause the system to perform operations of:
determine a first set of values of permission parameters for the second portfolio record in response to the second portfolio record being subordinate to the first portfolio record, the first set of values of permission parameters being applied in response to accessing the second portfolio record from the first portfolio page.

16. The system of claim 15, wherein the permission parameters characterize access to one or more project records that are subordinate to the second portfolio record.

17. The system of claim 16, wherein access to the one or more project records is characterized by ability to navigate through the collaboration environment.

18. The system of claim 15, wherein the permission parameters characterize availability of features.

19. The system of claim 18, wherein the features are specific to completing and/or supporting individual units of work and/or individual projects.

20. The system of claim 19, wherein the features include one or more of specifying completion, communicating within the collaboration environment, communicating outside the collaboration environment, generating meetings, accessing application programs, or editing.

* * * * *